US006981169B2

(12) United States Patent
Chandran et al.

(10) Patent No.: US 6,981,169 B2
(45) Date of Patent: *Dec. 27, 2005

(54) MODIFIED GLITCH LATCH FOR USE WITH POWER SAVING DYNAMIC REGISTER FILE STRUCTURES

(75) Inventors: Arjun P. Chandran, Sunnyvale, CA (US); Gregg K. Tsujimoto, Santa Clara, CA (US); Anup S. Mehta, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 605 days.

This patent is subject to a terminal disclaimer.

(21) Appl. No.: 10/083,931

(22) Filed: Feb. 26, 2002

(65) Prior Publication Data

US 2003/0163749 A1 Aug. 28, 2003

(51) Int. Cl.$^7$ .............................................. G06F 1/04
(52) U.S. Cl. .................. 713/600; 713/500; 713/502; 713/503; 713/600; 712/216; 712/218; 365/195; 365/196; 365/233
(58) Field of Search .............................. 713/600, 500, 713/502, 503; 712/216, 218; 365/195, 196, 365/233

(56) References Cited

U.S. PATENT DOCUMENTS

| 4,511,993 | A  | * | 4/1985  | Bromme et al. ............ 713/600 |
| 4,638,459 | A  | * | 1/1987  | Pechar et al. ............... 365/104 |
| 5,563,835 | A  | * | 10/1996 | Oldham ....................... 365/207 |
| 5,623,615 | A  | * | 4/1997  | Salem et al. ................ 712/238 |
| 6,138,211 | A  | * | 10/2000 | Ahn et al. ................... 711/136 |
| 6,337,833 | B1 | * | 1/2002  | Kanazashi et al. .......... 365/233 |
| 6,339,552 | B1 | * | 1/2002  | Taruishi et al. ........ 365/189.05 |
| 6,594,185 | B1 | * | 7/2003  | Takagi ........................ 365/195 |
| 6,687,843 | B2 | * | 2/2004  | Kwak ......................... 713/500 |
| 2003/0154365 | A1 | * | 8/2003 | Chandran et al. ........... 712/218 |

OTHER PUBLICATIONS

Steven Wallace et al.; Title: "Design and Implementation of a 100 Mhz Reorder Buffer" IEEE 1995, -07803-2428-5/95.*

* cited by examiner

Primary Examiner—Lynne H. Browne
Assistant Examiner—Nitin C. Patel
(74) Attorney, Agent, or Firm—Gunnison, McKay & Hodgson, L.L.P.; Philip J. McKay

(57) ABSTRACT

In the Retirement Payload Array (RPA) of a microprocessor, the signal "READ" is logically combined with the primary clock signal "CLK" in a control circuit of a modified glitch latch such that the glitch latch will only reset, and therefore a reset edge or "glitch" will only appear, when new data is read and the signal IN will return to zero and allow the modified glitch latch to recover.

18 Claims, 15 Drawing Sheets

MODIFIED GLITCH LATCH FOR USE WITH POWER SAVING DYNAMIC REGISTER FILE STRUCTURES

FIELD OF THE INVENTION

The present invention relates generally to microprocessors and, more particularly, a modified "glitch" latch for use with Retirement Payload Arrays used in the Retirement Window of Instruction Scheduling Units of microprocessors.

BACKGROUND OF THE INVENTION

With the emergence of an electronics market that stresses portability, compact size, lightweight and the capability for prolonged remote operation, a demand has arisen for low power circuits and systems. This demand has motivated circuit designers to depart from conventional circuit designs and venture into more power and space efficient alternatives. Nowhere is the minimization of power and space usage more critical than in the processors employed in computer systems.

Processor architectures can be represented as a collection of interacting functional units as shown in FIG. 1. These functional units, discussed in greater detail below, perform the functions of fetching instructions and data from memory, decoding fetched instructions, scheduling instructions to be executed, executing the instructions, managing memory transactions, retiring instructions and interfacing with external circuitry and devices.

The present invention is described in terms of apparatus and methods particularly useful in a highly pipelined and superscalar processor 102 shown in block diagram form in FIG. 1 and FIG. 2. The particular examples represent implementations that can be used to issue and execute multiple Instructions Per Cycle (IPC) and are amenable to high clock frequency operations. However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general-purpose computer system 100 incorporating a processor 102 in accordance with the present invention. Computer system 100 comprises an address/data bus 101 for communicating information, processor 102 coupled with bus 101 through input/output (I/O) interface 103 for processing data and executing instructions, and memory system 104 coupled with bus 101 for storing information and instructions for processor 102. Memory system 104 comprises, for example, cache memory 105 and main memory 107. Cache memory 105 can include one or more levels of cache memory. In a typical embodiment, processor 102, I/O interface 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available devices, including another computer. Mass storage device 117 is coupled to bus 101, and may be implemented using one or more magnetic hard disks, magnetic tapes, CDROMs, large banks of random access memory, or the like. Mass storage 117 may include computer programs and data stored therein. Some or all of mass storage 117 may be configured to be incorporated as a part of memory system 104.

In a typical computer system 100, processor 102, I/O interface 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. In addition, functional units are identified using a precise nomenclature for ease of description and understanding, but other nomenclature often is used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache (I$) is commonly a portion of the level one cache (L1$), with another portion of the L1 cache dedicated to data storage (D$). IFU 202 fetches one or more instructions at a time by appropriately addressing the instruction cache. The instruction cache feeds addressed instructions to instruction rename unit (IRU) 204. Typically, IFU 202 fetches multiple instructions each cycle, and in a specific example fetches eight instructions each cycle.

In the absence of a conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to minimize dependencies. IRU 204 further comprises dependency checking mechanisms that analyze the instructions fetched by IFU 202 amongst themselves, and against those instructions installed in ISU 206, to establish true dependencies. IRU 204 outputs renamed instructions to instruction scheduling unit (ISU) 206.

ISU 206 receives renamed instructions from IRU 204 and registers them for execution. Upon registration, instructions are deemed "live instructions" in a specific example. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction issue logic is used. ISU 206 may include mechanisms to redirect execution appropriately when traps or interrupts occur and to ensure efficient execution of multiple threads where multiple threaded operation is used.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch path and initiates IFU 202 to fetch from the correct branch address. An instruction is retired when it has finished execution and all older instructions have retired. Upon retirement, the instruction's result is written into the appropriate register file and it is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions concurrently in execution on the processor pipelines. IEU 208 executes all integer instructions including determining correct virtual addresses for load/store instructions. IEU 208 also maintains correct architectural register state for a plurality of integer registers in processor 102.

FGU 210 includes one or more pipelines, each comprising one or more stages that implement floating point instructions. FGU 210 also includes mechanisms for holding the results and state of speculatively executed floating point and graphics instructions. FGU 210 functions to perform final decoding of floating point instructions before they are executed on the execution units and to determine operand bypassing amongst instructions concurrently in execution on the processor pipelines. In the specific example, FGU 210 includes one or more pipelines dedicated to implementing special purpose multimedia and graphics instructions that are extensions to standard architectural instructions for a processor. FGU 210 may be equivalently substituted with a floating point unit (FPU) in designs in which special purpose graphics and multimedia instructions are not used. FGU 210 preferably includes mechanisms to access single and/or double precision architectural registers as well as single and/or double precision rename registers.

A data cache memory unit (DCU) 212 shown in FIG. 2, including cache memory 105 shown in FIG. 1, functions to buffer memory reads from off-chip memory through external interface unit (EIU) 214. Optionally, DCU 212 also buffers memory write transactions. DCU 212 comprises two hierarchical levels of cache memory on-chip (L1$ and L2$) and a third cache level (L3$) accessible through EIU 214. DCU 212, alternatively referred to as the data cache subsystem, comprises separate instruction and data caches (I$ and D$) at the primary level 1 cache L1$, a unified on-chip level 2 cache L2$ and a unified external level 3 cache L3$. DCU 212 also includes controller logic and associated queues at each level. One or more of the cache levels within DCU 212 may be read only memory to eliminate the logic associated with cache writes.

FIG. 3 is a high-level block diagram showing the fundamental components of ISU 206 from FIG. 2. As discussed above, ISU 206 receives renamed instructions from IRU 204 (FIG. 2) and registers them for execution. This function of ISU 206 is performed by scheduling window 301 (FIG. 3). In addition, as also discussed above, ISU 206 operates to retire executed instructions when completed by IEU 208 and FGU 210 (FIG. 2). This function is performed, in large part, by retirement window 303 of ISU 206 (FIG. 3). Retirement window 303 typically includes Instruction Retirement Logic 305, hereinafter referred to as IRL 305, and Retirement Payload Array 307, hereinafter referred to as RPA 307.

One of the functions of IRL 305 is to generate two important signals, or vectors, a retire pointer signal, hereinafter referred to as signal "READ POINTER" and an advance pointer signal, hereinafter referred to as signal "ADVANCE POINTER". The signals "READ POINTER" and "ADVANCE POINTER" are coupled from IRL 305 to RPA 307 by lines 309 and 311, respectively, in FIG. 3. The signals "READ POINTER" and "ADVANCE POINTER" are also discussed in more detail below.

FIG. 4 shows one example of a typical RPA 307. As seen in FIG. 4, RPA 307 is comprised of M-rows, R0 to RM, and N-columns, C0 to CN, of memory cells, such as exemplary memory cells 405 and 406. As shown in FIG. 4, each memory cell, such as exemplary memory cells 405 and 406, is coupled to a read word line (RWL), such as read word lines RWL0 to RWLM, and each memory cell in a given row R0 to RM is coupled to the same RWL, RWL0 to RWLM, respectively. As also shown in FIG. 4, each memory cell, such as exemplary memory cells 405 and 406, is coupled to a read bit line (RBL), such as read bit lines RBL0 to RBLN, and each memory cell in a given column C0 to CN is coupled to the same RBL, RBL0 to RBLN, respectively.

As also shown in FIG. 4, each RBL, RBL0 to RBLN, is coupled to a corresponding pre-charge device, PC0 to PCN, respectively, and a sensing device, S0 to SN, respectively. Consequently: RBL0 is coupled to PC0 and S0; RBL1 is coupled to PC1 and S1; RBL2 is coupled to PC2 and S2; RBL3 is coupled to PC3 and S3; RBLN-3 is coupled to PCN-3 and SN-3; RBLN-2 is coupled to PCN-2 and SN-2; RBLN-1 is coupled to PCN-1 and SN-1; RBLN is coupled to PCN and SN. Pre-charging and pre-charge devices, such as PC0 to PCN, are well known in the art. Pre-charge devices PC0 to PCN typically consist of various well-known elements or structures such as PFETs, NFETs and the like. In addition, RBL sensing, and sensing devices, such as S0 to SN, are also well known in the art and sensing devices S0 to SN typically consist of various well-known elements or structures such as latches, cross coupled latches and the like.

RPA 307 also includes read pointer 450. The signal "READ POINTER" (not shown) from IRL 305 is used to generate read pointer 405. In addition, the signal "ADVANCE POINTER" (not shown) from IRL 305 is used to advance read pointer 450 from one read word line, such as read word line RWL2 in FIG. 4, to a new read word line, such as read word line RWL3 in FIG. 4, as shown by the dotted line pointer 450A in FIG. 4. The signal "ADVANCE POINTER" from IRL 305 is active only when read pointer 450 is moved or shifted. In all other instances, signal "ADVANCE POINTER" is inactive.

One embodiment of RPA 307 is a 192 column, 16-read word line register file structure employing a dynamic, full swing pull down read mechanism. Consequently, in this one embodiment of a RPA 307, N is equal to 192 and M is equal to 16.

In prior art operation of RPA 307, pre-charge devices PC0 to PCN pre-charged RBL0 to RBLN, respectively, on each "A" phase, i.e., the pre-charge phase, of a clock signal. Then on each "B" phase, i.e., the evaluate phase, of the clock signal, read pointer 450 indicated which read word line, RWL0 to RWLM, was to be read. Sensing devices S0 to SN would then sense their respective RBLs, RBL0 to RBLN, to yield an "updated" result. Consequently, in the prior art, RPA 307 would read RPA 307 each time the primary clock switched to the read or "B" phase, regardless of whether read pointer 450 had advanced. In the prior art, the evaluated "new" result was then sampled by the free running sensing devices S0 to SN and the evaluated result was then typically latched until the next "B" phase of the clock signal initiated a new read.

In the prior art method described above, if read pointer 450 did not shift, i.e., advance or move read word lines, RPA 307, and sensing devices S0 to SN, continued to read and "update" data, and dissipate significant read power, even if the read data was the same as that of the previous "B" phase. Since, it often was the case that the read data was the same as that of the previous "B" phase, using the prior art mechanisms, Read Bit Lines (RBLs), RBL0 to RBLN would discharge every "B" phase even when the data in the array was the same for multiple cycles.

Thus, by way of example, using prior art methods with the embodiment of an RPA 307 that is a 192 column, 16 row register file structure employing a dynamic, full swing pull down read mechanism discussed above, in each "B" phase of the primary clock, all 192 bit lines, RBL0 to RBL192 (not shown) of the RPA 307 would potentially discharge. This resulted in a significant waste of power as all 192 RBLs were read and power was used to rewrite identical data repeatedly with each shift of the system clock to the "B" phase.

FIG. 5 shows a portion of exemplary prior art column C1 of RPA 307 of FIG. 4. While prior art column C1 is chosen for exemplary purposes, the structure of FIG. 5, and the following discussion, is equally applicable to any of the prior art columns C1 to CN shown in FIG. 4. As seen in FIG. 5, prior art column C1 included pre-charge device PC1, in this case a PFET, and sensing device S1. Shown in FIG. 5 are rows R0, R1 and RM. In the example of FIG. 5, each row R0 to RM includes a corresponding pull-down device PD0 to PDN, respectively. In actual practice, as shown in FIG. 4, each row R0 to RM would include numerous memory cells equal to the number of columns "N". In the prior art, each pull-down device PD0 to PDM was coupled to RBL1 as shown.

In the prior art, each pull-down device PD0 to PDM was coupled to the output 517, 519, and 521, respectively, of a corresponding one of Nor-Gates 501, 503, and 505, respectively. A first input line 500, 504, and 507 of Nor-Gates 501, 503, and 505, respectively, was coupled to receive signals CELL0_1, CELL1_1, CELLM_1, respectively. Signals CELL0_1, CELL1_1, CELLM_1 were signals representing the contents of corresponding memory cells, such as exemplary memory cells 405 and 406 in FIG. 4. In the prior art, second input lines 511, 513, and 515 of Nor-Gates 501, 503, and 505, respectively, were coupled directly to the signal "READ POINTER".

As discussed above with respect to FIG. 4, In the prior art, read pointer 450 (FIG. 4) selected one of memory cells (not shown) and the contents of the selected memory cell were then made available on RBL1 (FIG. 5) when the "B" phase of the signal CLK was begun, i.e., when CLK went low, the contents of the selected memory cell, was coupled to RBL1 and sensing device S1. As also discussed above, using the prior art method and structure of FIG. 5, if read pointer 450 (FIG. 4) did not shift, i.e., advance or move rows, prior art RPA 307 continued to read data on each "B" phase of CLK, and dissipate read power, even if the read data was the same as that of the previous "B" phase. Consequently, a significant amount of power was wasted.

The waste of power associated with the prior art methods is further illustrated in FIG. 5A. FIG. 5A is a signal diagram for prior art column C1 showing signals: CLK 550, the system clock; READ POINTER 551 from IRL 305 (FIG. 3), ADVANCE POINTER 552 from IRL 305 (FIG. 3) and READ 553, from output 517 of Nor-Gate 501, as an example. As shown in FIG. 5A, the signal "READ" at output 517 of Nor-Gate 501, for example, is active, and a read of RPA 307 (FIG. 4) is initiated, in each "B" phase of signal CLK 550. That is to say, at every time signal CLK 550 is in the "B" phase, i.e., at times T2, T4 and T6, signal READ 553 is active. However, as indicated at point 555 of time T4, the signal ADVANCE POINTER 552 is active only at time T4. Consequently, only at time T4 has the read pointer 450 (FIG. 4) actually advanced. Therefore, only at point 555 of time T4 has the data of RPA 307 (FIG. 4) changed. As a result, the reads initiated at times T2 and T6 by signal READ 553 result in reading and rewriting the same data from the previous cycle. Clearly, this is a waste of energy.

What is needed is a method and apparatus for controlling when data from a RPA is read so that reads occur only when there is new data to be read.

SUMMARY OF THE INVENTION

According to the present invention, the pointer advance signal "ADVANCE POINTER" from the Instruction Retirement Logic (IRL) of the Instruction Scheduling Unit (ISU) is utilized to provide conditional read signals. Consequently, according to the invention, a read of the RPA is completed only if it is determined that the read word line being read in the current cycle is not the same read word line that was read in the previous cycle. According to the invention, if the read word line is the same, the RPA read is cut off, i.e. the bitlines remain pre-charged, and no read power is dissipated reading the unchanged data.

In addition, in one embodiment of the invention, the signal "READ" is logically combined with the primary clock signal "CLK" in a control circuit of a modified glitch latch such that the glitch latch will only reset, and therefore a reset edge or glitch will only appear, when new data is read and the signal IN will return to zero. Consequently, according to the invention, a reset edge or glitch will only appear when the glitch latch can recover. Therefore, using the modified glitch latch of the invention, no fatal errors are introduced.

In contrast, as discussed above, in the prior art, a read operation was initiated on the RPA every "B" phase of the clock signal regardless of whether the read pointer was in the same position as the previous cycle or not. Thus, in the prior art, in each "B" phase of the clock, all read bit lines of each of the columns of the RPA could discharge leading to wasteful power dissipation.

Using the method and structure of the present invention, the RPA read is activated only when the read pointer shifts and there is new data to be read. According to the invention, at all other times, i.e., when there is no change in the data, the RPA holds the results of the previous read operation.

Consequently, using the method and structure of the invention, no power is dissipated making repeated reads of the same data. Therefore, the method and structure of the present invention is more efficient and the power savings within the RPA translates into lower risk for Joule Heating and electro-migration problems.

In addition, the method and structure of the present invention takes advantage of the pointer advance signal "ADVANCE POINTER" already being generated by the IRL to determine when the read pointer has shifted. Consequently, the present invention can be readily adapted to existing architectures and designs.

In addition, as discussed in more detail below, one embodiment of the present invention includes the addition of only minimal components. Consequently, the method and structure of the invention has minimal layout and Design for Test (DFT) implications.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this specification, illustrate embodiments of the invention and, together with the description, serve to explain the advantages and principles of the invention. In the drawings.

DETAILED DESCRIPTION

The invention will now be described in reference to the accompanying drawings. The same reference numbers may be used throughout the drawings and the following description to refer to the same or like parts.

Figure 1:
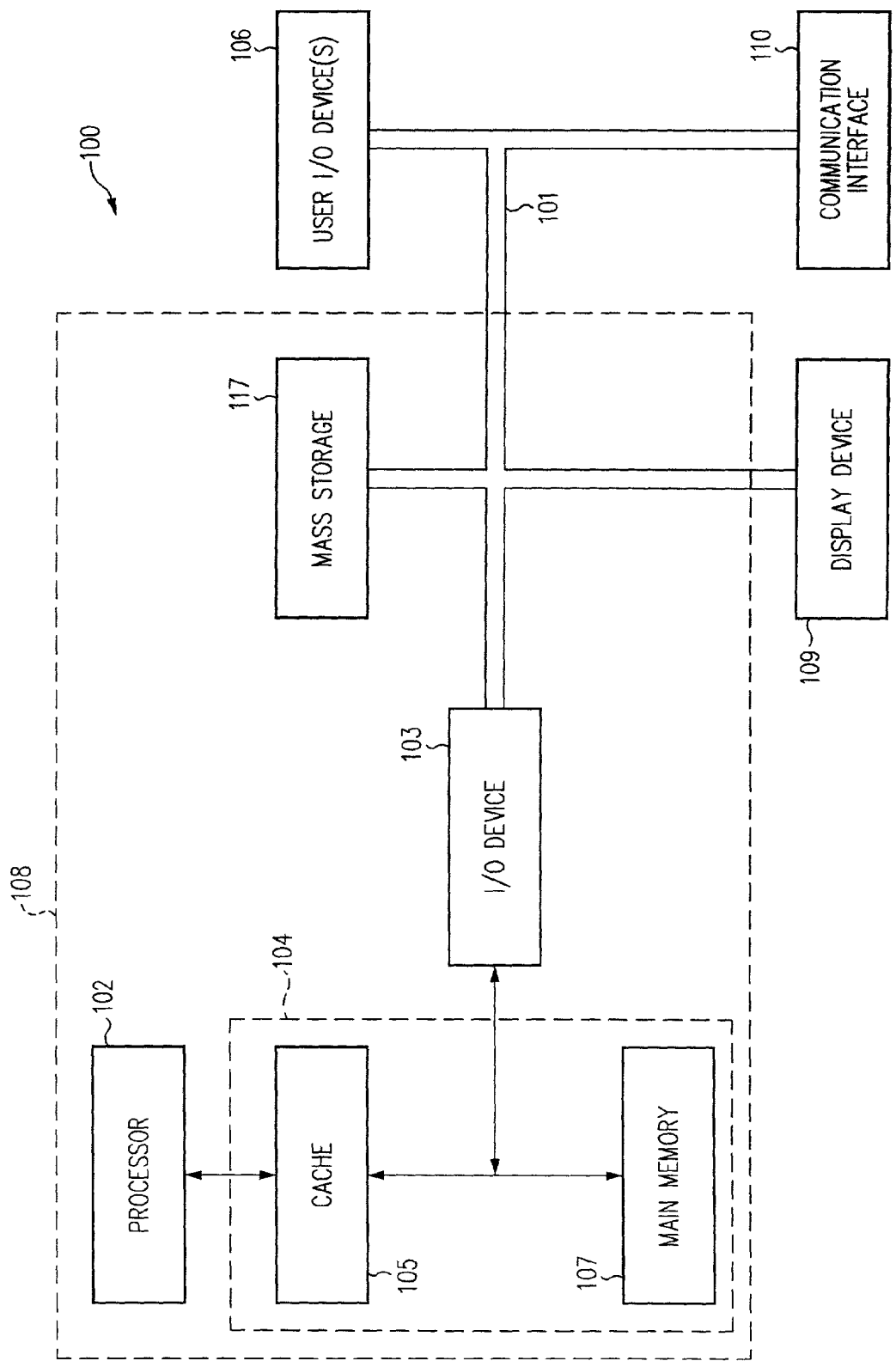
FIG. 1 shows, in block diagram form, a computer system in accordance with one embodiment of the present invention.
Figure 2:
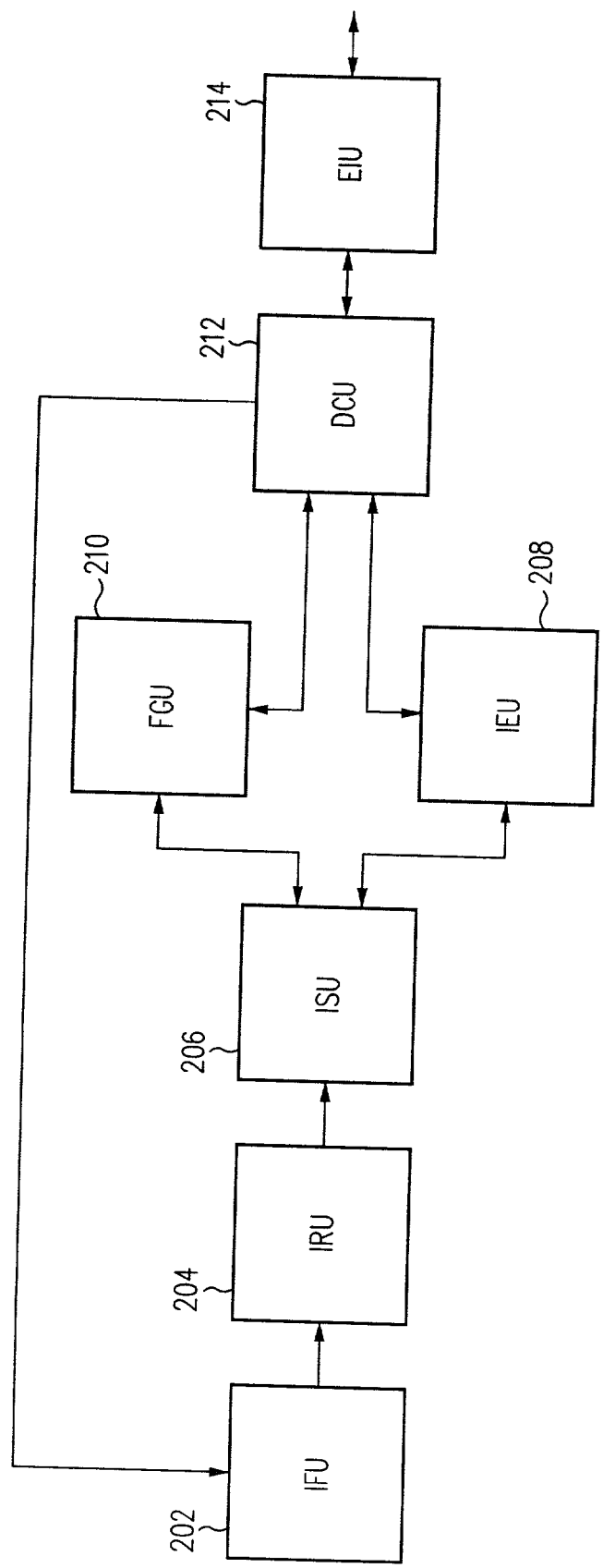
FIG. 2 shows a processor in block diagram form in accordance with one embodiment of the present invention.

According to the present invention, the pointer advance signal "ADVANCE POINTER" (852 in FIG. 8) from the Instruction Retirement Logic Block (305 in FIG. 3) of the Instruction Scheduling Unit (206 in FIGS. 2 and 3) is utilized to provide conditional read signal "CONDITIONAL READ" (853 in FIG. 8) and a read of the RPA (307 in FIGS. 3 and 4) is completed only if it is determined that the read word line (RWL0 to RWLM in FIG. 4) being read in the current cycle is not the same read word line that was read in the previous cycle. According to the invention, if the read word line is the same, the RPA read is cut off, i.e. the bitlines remain pre-charged, and no read power is dissipated reading the unchanged data.

In addition, in one embodiment of the invention, the signal "READ" is logically combined with the primary clock signal "CLK" in a control circuit (1090 in FIG. 10 and FIG. 12) of a modified glitch latch (1000 in FIG. 10 and FIG. 12) such that the glitch latch will only reset, and therefore a reset edge or glitch (1161 in FIG. 11) will only appear, when new data is read and the signal IN (1181 in FIG. 11) will return to zero. Consequently, according to the invention, a reset edge or glitch will only appear when the glitch latch can recover. Therefore, using the modified glitch latch of the invention, no fatal errors are introduced.

In contrast, as discussed above, in the prior art, a read operation was initiated on the RPA every "B" phase (T2, T4 and T6 in FIGS. 5A and 8) of the clock signal (CLK 550 in FIGS. 5A and 850 in FIG. 8) regardless of whether the read pointer (450 in FIG. 4) was in the same position as the previous cycle or not. Thus, in the prior art, in each "B" phase of the clock, all read bit lines (RBL0 to RBLN in FIG. 4) of the RPA could discharge leading to wasteful power dissipation.

Using the method and structure of the present invention, the RPA read is activated only when the read pointer shifts and there is new data to be read. According to the invention, at all other times, i.e., when there is no change in the data, the RPA holds the results of the previous read operation. Consequently, using the method and structure of the invention, no power is dissipated making repeated reads of the same data. Therefore, the method and structure of the present invention is more efficient and runs cooler. This power savings within the RPA translates into lower risk for Joule Heating and electro-migration problems.

In addition, the method and structure of the present invention takes advantage of the pointer advance signal "ADVANCE POINTER" already being generated by the IRL to determine when the retire pointer signal "READ POINTER" (552 in FIGS. 5A and 852 in FIG. 8) has shifted. Consequently, the present invention can be readily adapted to existing architectures and designs.

In addition, as discussed in more detail below, one embodiment of the present invention has minimal layout and Design for Test (DFT) implications.

It is to be understood that both the foregoing general description and following detailed description are intended only to exemplify and explain the invention as claimed.

Figure 6:
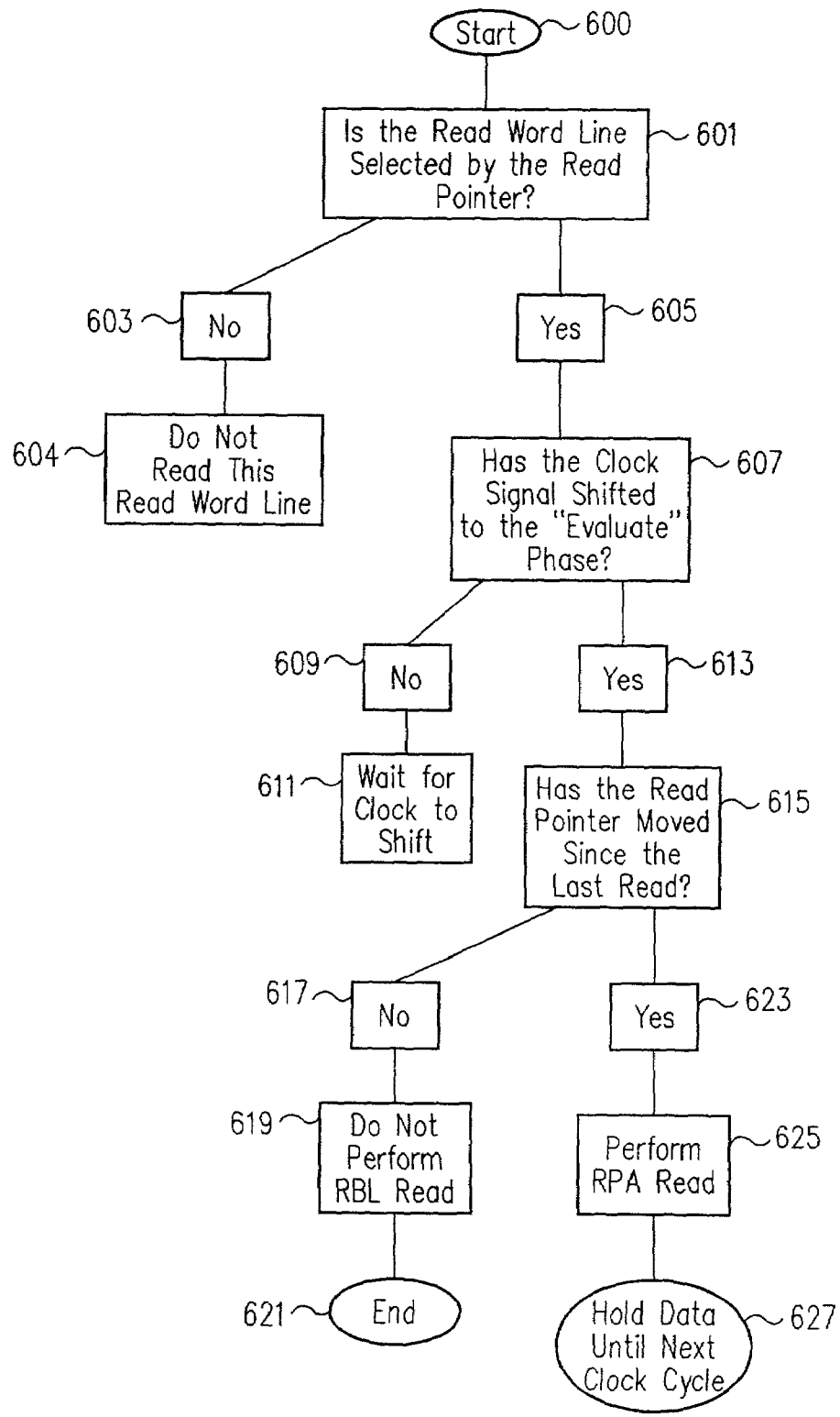
FIG. 6 is a flow chart of one embodiment of the method of the present invention.
Figure 8:
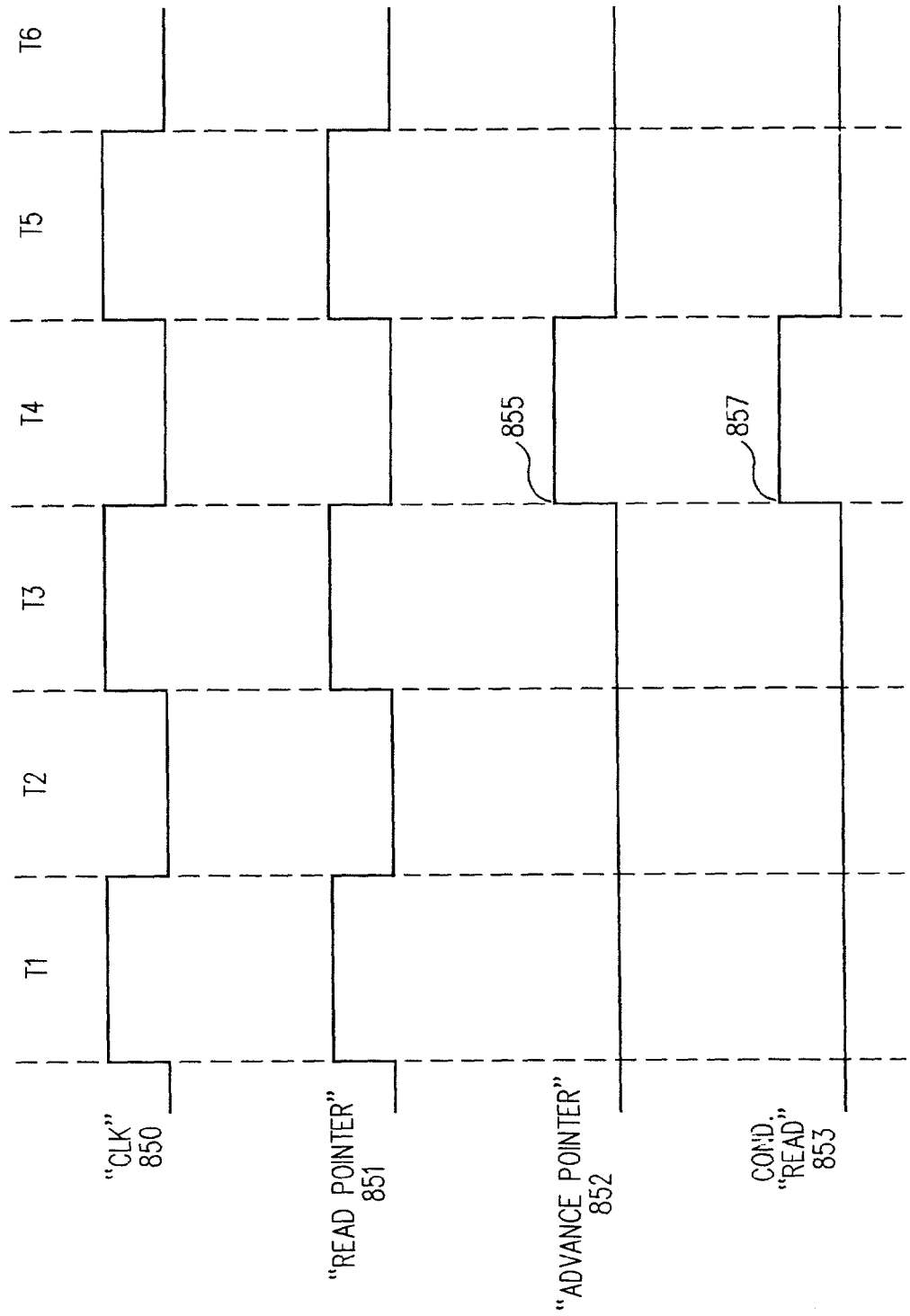
FIG. 8 is a signal diagram for one embodiment of a modified column C1 in accordance with the principles of the invention showing signals: CLK, the system clock; READ POINTER, generated by the IRL, ADVANCE POINTER, generated by the IRL and CONDITIONAL READ generated in accordance with the invention.

FIG. 6 is a flow chart of one embodiment the method of the present invention. FIG. 8 is a signal diagram for one embodiment of the invention showing signals: CLK 850, the system clock; READ POINTER 851, generated by the IRL, ADVANCE POINTER 852, generated by the IRL and CONDITIONAL READ 853 generated in accordance with the invention. The method of one embodiment of the invention will now be described with reference to FIGS. 6 and 8.

At Start 600, a new cycle of the clock signal (CLK 850 in FIG. 8) begins. At 601 in FIG. 6, a determination is made as to whether the read pointer has selected the read word line in question. If, as at 603, the answer is "NO" the read pointer has not selected the read word line in question, then this read word line is not selected and no read of the read word line in question will take place as shown in 604. If, as at 605, the answer is "YES" and the read pointer has selected the read word line in question, then the method moves on to 607.

At 607, a determination is made as to whether the clock signal (CLK 850 in FIG. 8) has shifted to the "evaluate" or "B" phase (T2, T4 and T6 in FIG. 8). If, as at 609 in FIG. 6, the answer is "NO" the clock signal has not shifted to the evaluate phase, then no read of the read word line in question will take place and the method must, as shown in 611, wait for a shift of the clock signal to the evaluate phase. If, as at 613, the answer is "YES", the read pointer has selected the read word line in question and the clock has shifted to the evaluate phase, then the method moves on to 615.

At 615, a determination is made as to whether the read pointer has moved since the last read cycle. As discussed in more detail below, in one embodiment of the invention, this determination is made by receiving the signal "ADVANCE POINTER" (852 in FIG. 8) and checking to see if this signal has gone active, indicating a read pointer movement (see point 855 in FIG. 8). If, as at 617 in FIG. 6, the answer is "NO" the read pointer has not moved since the last read cycle (see times T1, T2, T3, T5 and T6 in FIG. 8), then a read is not performed as shown by 619 in FIG. 6 and the method ends at 621 until the next clock cycle. If, as at 623, the answer is "YES", the read pointer has selected the read word line in question, the clock has shifted to the evaluate phase and the read pointer has moved since the last read cycle (see time T4 in FIG. 8), then signal CONDITIONAL READ 853 goes active (see point 857 in FIG. 8) and an RPA read is performed at 625 in FIG. 6. The data is then held at 627 until the next movement of the read pointer is combined with a shift of the clock signal to the evaluate phase.

Figure 4:
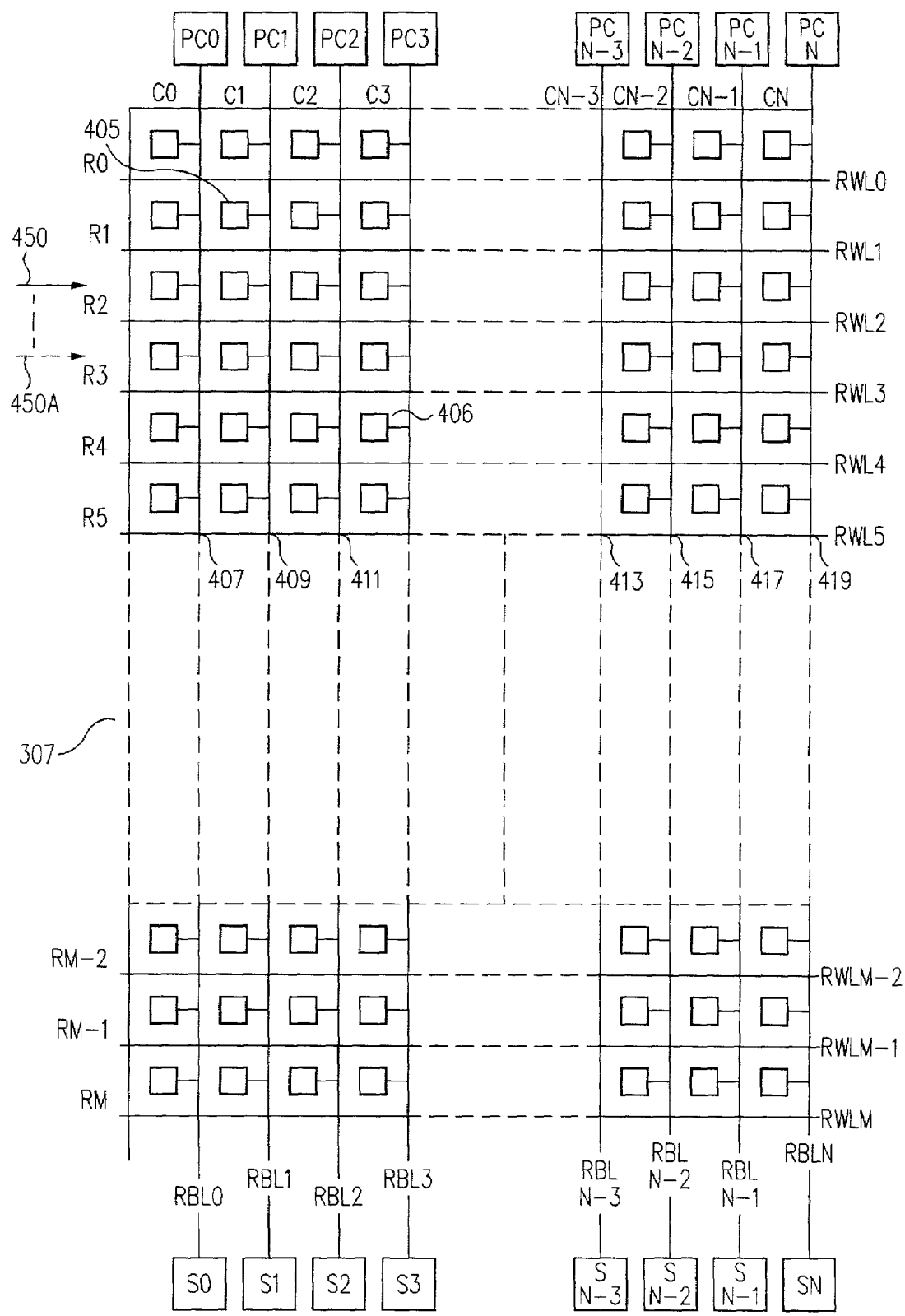
FIG. 4 shows one example of a typical Retirement Payload Array (RPA) from FIG. 3 in accordance with one embodiment of the present invention.
Figure 7:
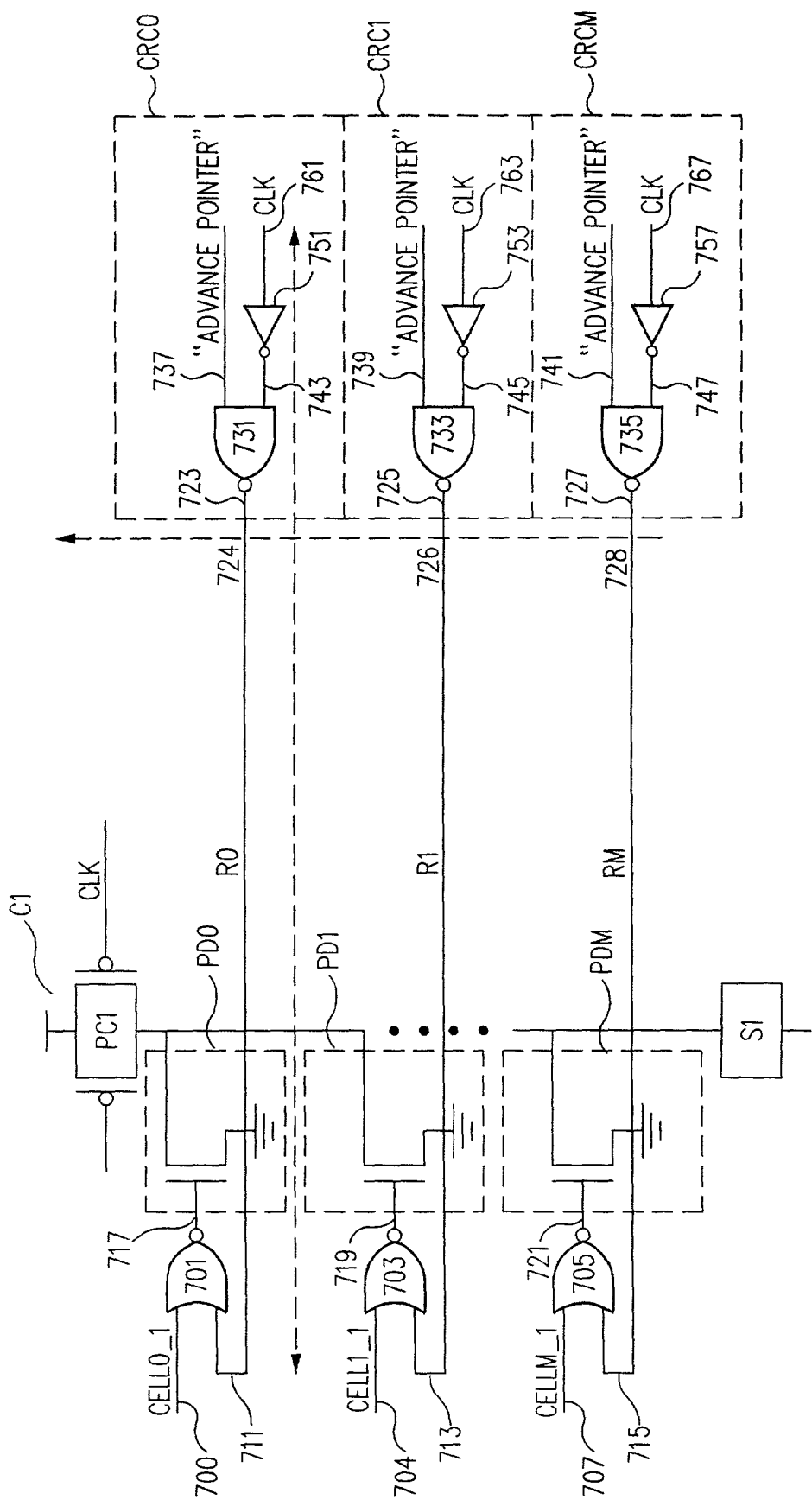
FIG. 7 shows a portion of an exemplary column C1 of an RPA that has been modified in accordance with the principles of one embodiment of the present invention.

FIG. 7 shows a portion of exemplary modified column C1 of an RPA, such as RPA 307 of FIG. 4, which has been modified in accordance with the present invention. While modified column C1 is chosen for exemplary purposes, the structure of FIG. 7, and the following discussion, is equally applicable to any of the columns C1 to CN shown in FIG. 4 that are modified according to the present invention.

As seen in FIG. 7, modified column C1 includes precharge device PC1, in this case a PFET, and sensing device S1. Also shown in FIG. 7 are rows R0, R1 and RM. In the embodiment of the invention shown in FIG. 7, each row R0 to RM includes a corresponding pull-down device PD0 to PDM, respectively. In actual practice, as shown in FIG. 4, each row R0 to RM would include numerous memory cells (not shown) and numerous pull-down devices PD0 to PDM equal to the number of columns "N". As shown in FIG. 7, in one embodiment of the invention, each pull-down device PD0 to PDM is coupled to a read bit line, RBL1, as shown.

According to one embodiment of the invention, each pull-down device PD0 to PDM is coupled to the output 717, 719, 721, respectively, of a corresponding one of Nor-Gates 701, 703, and 705, respectively. According to the invention, a signal "CONDITIONAL READ" (853 in FIG. 8) is generated at outputs 717, 719, and 721, respectively, of a corresponding one of Nor-Gates 701, 703, and 705 (FIG. 7), respectively. When active, the signal "CONDITIONAL READ" initiates a read of RPA 307 (FIG. 4).

As seen in FIG. 7, a first input line 700, 704, and 707 of Nor-Gates 701, 703, and 705, respectively, is coupled to receive signals CELL0_1, CELL1_1, CELLM_1, respectively. Signals CELL0_1, CELL1_1, CELLM_1 are signals representing the contents of corresponding memory cells, such as exemplary memory cells 405 and 406 in FIG. 4. Second input lines 711, 713, and 715 of Nor-Gates 701, 703, 705, respectively, are coupled to the outputs 724, 726, and 728 of conditional read circuits CRC0, CRC1 and CRCM, respectively.

Figure 3:
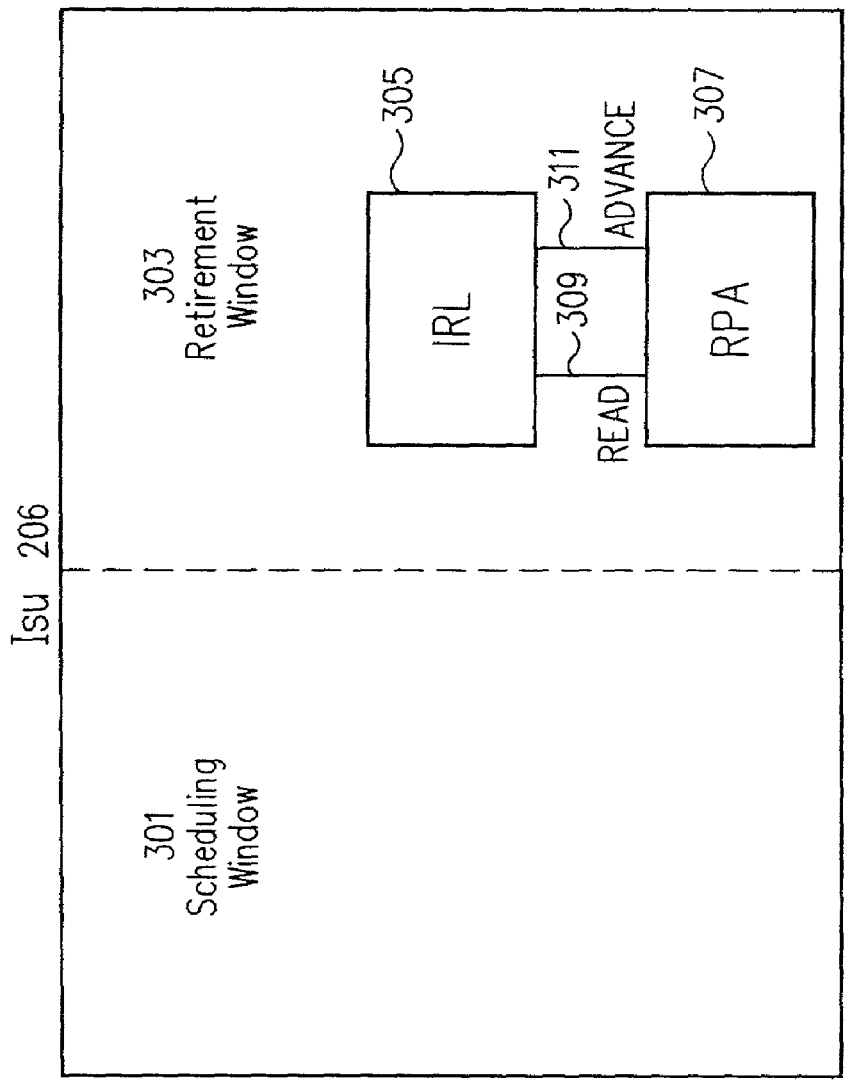
FIG. 3 is a high-level block diagram showing the fundamental components of the Instruction Scheduling Unit (ISU) from FIG. 2.

In one embodiment of the invention, conditional read circuits CRC0, CRC1 and CRCM each include a NAND-Gate, 731, 733 and 735, respectively, and an inverter, 751, 753 and 757, respectively. In one embodiment of the invention the signal CLK, i.e., the signal "CLK" is coupled to input lines 761, 763 and 767 of inverters 751, 753 and 757, respectively. The inverted "CLK" signal is then coupled to the first input lines 743, 745 and 747 of NAND-Gates, 731, 733 and 735, respectively. In one embodiment of the invention, the second input lines 737, 739, and 741 of NAND-Gates, 731, 733 and 735, respectively, are coupled to the signal ADVANCE POINTER (853 of FIG. 8) from IRL 305 (FIG. 3). As shown in FIG. 7, in one embodiment of the invention, the outputs 723, 725, and 727 of NAND-Gates, 731, 733 and 735, respectively, are coupled to outputs 724, 726, and 728 of conditional read circuits CRC0, CRC1 and CRCM, respectively.

FIG. 8 is a signal diagram for modified column C1 of FIG. 7 showing signals: CLK 850, the system clock; READ POINTER 851 from IRL 305 (FIG. 3), ADVANCE POINTER 852 from IRL 305 (FIG. 3) and CONDITIONAL READ 853, generated from output 717 of Nor-Gate 701 in FIG. 7, as an example. As shown in FIG. 8, the signal CONDITIONAL READ 853 at output 717 of Nor-Gate 701, for example, is active, and a read of RPA 307 (FIG. 4) is initiated, only when the signal ADVANCE POINTER 852 from IRL 305 (FIG. 3) is active, indicating the read pointer (450 in FIG. 4) has advanced, and the "B" phase of signal CLK 850 is begun (see time T4 ion FIG. 8). That is to say, at every other time when the signal CLK 850 is in the "B" phase and the signal ADVANCE POINTER 852 from IRL 305 (FIG. 3) is not active, i.e., at times T1, T2, T3, T5 and T6, the signal CONDITIONAL READ 853 is not active and a read of the RPA is not initiated. However, as indicated at point 855 of time T4, when the signal ADVANCE POINTER 852 is active, and the signal CLK 850 is in the "B" phase, signal CONDITIONAL READ 853 is active and a read of the RPA is initiated. Consequently, according to the invention, a read of the RPA is initiated only when the read pointer has advanced and there is new data to read. At all other times no read is initiated and power is saved.

Figure 5:
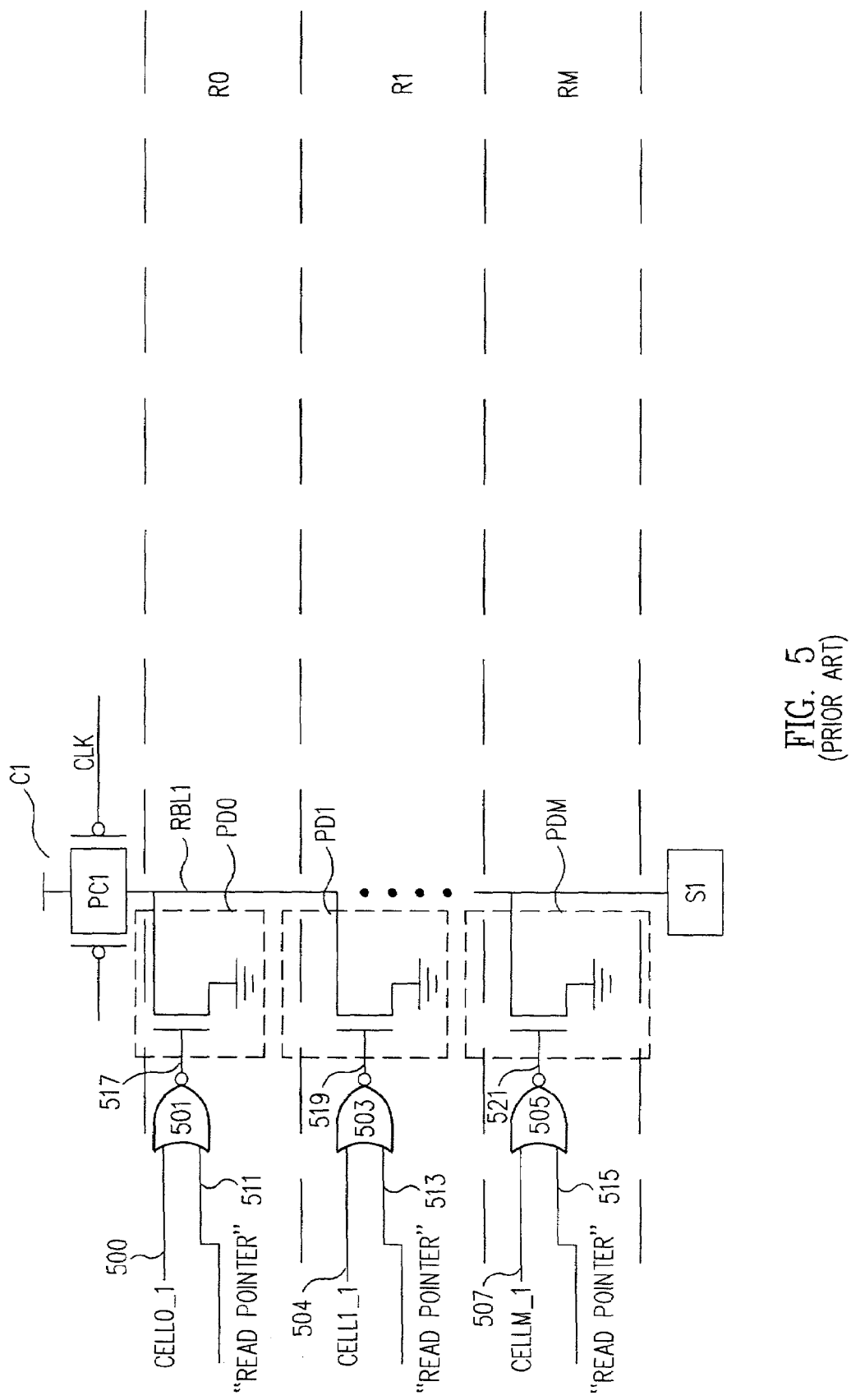
FIG. 5 shows a typical prior art column of a Retirement Payload Array (RPA) from FIG. 4.
Figure 5A:
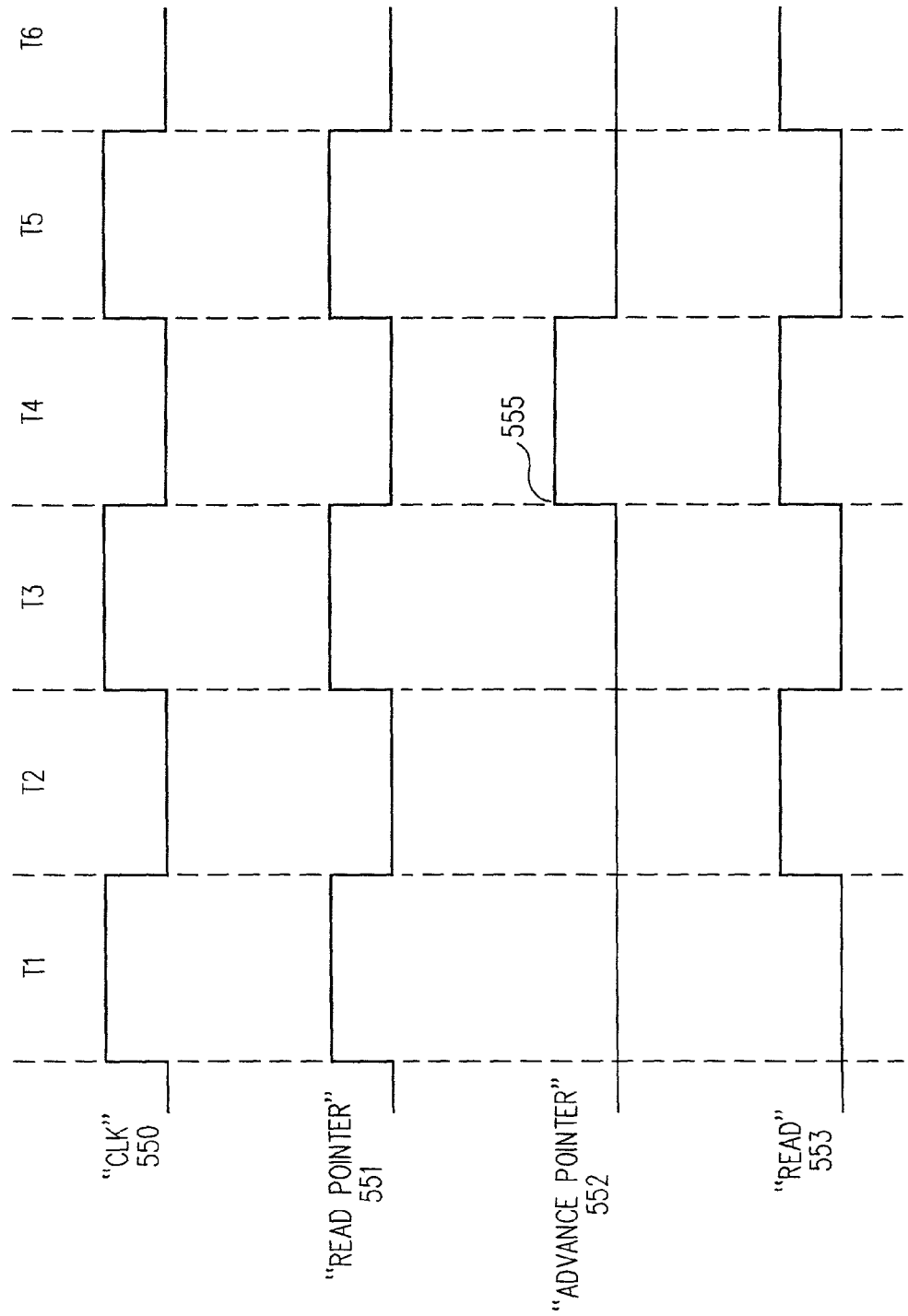
FIG. 5A is a signal diagram for prior art column C1 showing signals: CLK, the system clock; READ POINTER from the IRL, ADVANCE POINTER from the IRL and READ.

In contrast, recall that in the prior art, as shown in FIGS. 5 and 5A and discussed above, second input lines 511, 513, and 515 of Nor-Gates 501, 503, 505, respectively, were coupled directly to the signal "CLK". Therefore, even if read pointer 450 (FIG. 4) did not shift, i.e., advance or move rows, and there was no new data, signal READ 553 (FIG. 5A) still went active with each "B" phase of CLK 550 and a read was initiated. Consequently, in the prior art, RPA 307 (FIG. 4) continued to read data and dissipate read power even if the read data was the same as that of the previous "B" phase and a significant amount of power was wasted.

In some embodiments of the invention discussed above, it is highly advantageous to use dynamic to static interfaces to implement the RBL sensing devices, such as S0 to SN in FIG. 4 and S1 in FIG. 7. In addition, in some embodiments of the invention it is particularly advantageous to utilize latches known as "glitch latches" as RBL sensing devices, such as S0 to SN in FIG. 4 and S1 in FIG. 7. This is because "glitch latches" are designed to operate on a pre-charge and evaluate cycle basis and glitch latches have a very small physical layout. However, as discussed in more detail below, prior art glitch latches are not suitable for use with the present invention and therefore, according to the present invention a "modified glitch latch" is disclosed.

Figure 9A:
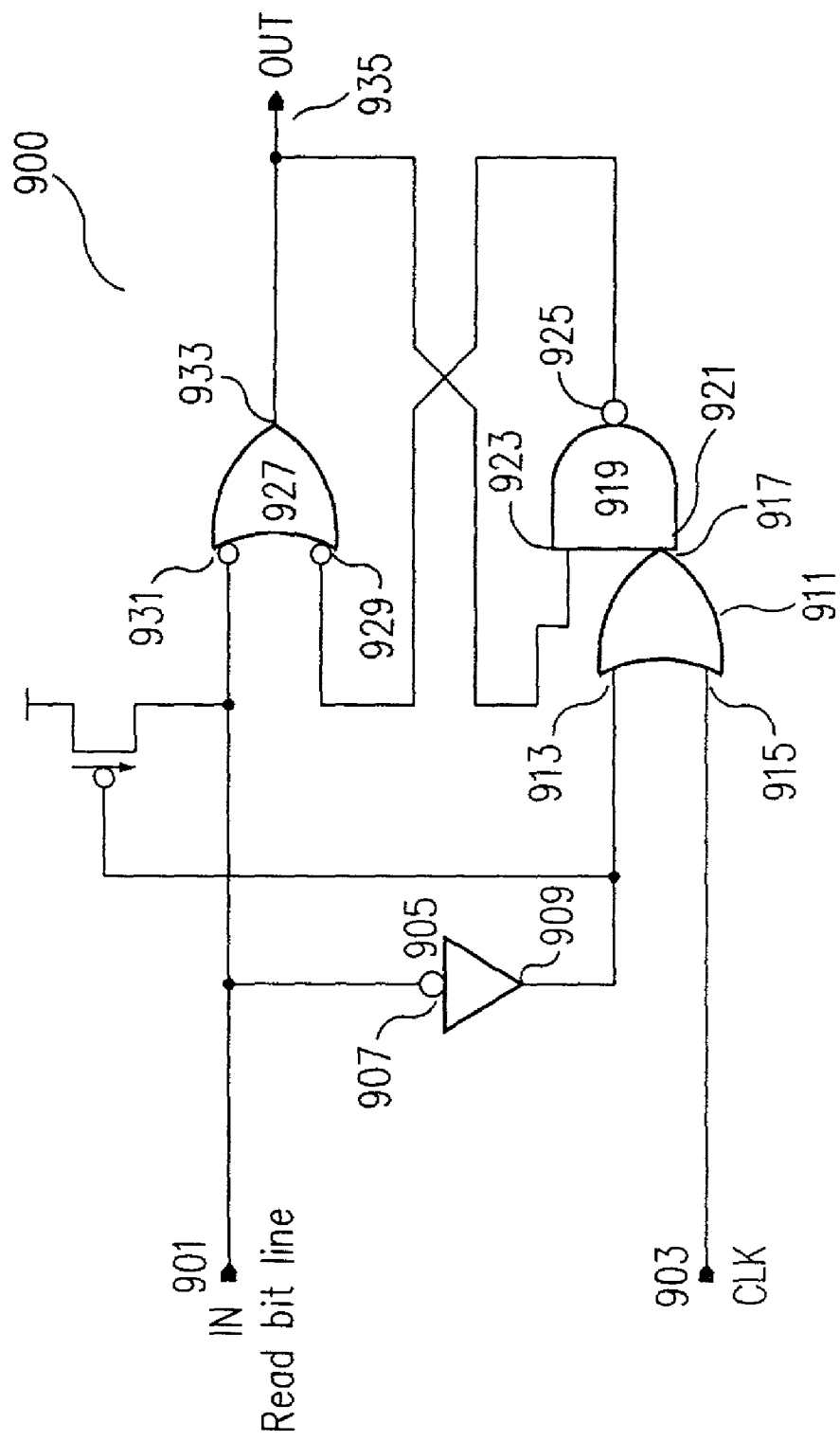
FIG. 9A shows a typical prior art glitch latch.

FIG. 9A shows a typical prior art glitch latch 900 which included glitch latch input 901 coupled to signal IN, typically from the associated read bit line, and glitch latch input 903 coupled to clock signal CLK. Prior art glitch latch 900 also included inverter 905, with inverter input terminal 907 coupled to prior art glitch latch input terminal 901 and inverter output terminal 909. Prior art glitch latch 900 also included OR gate 911, with: OR gate first input terminal 915 coupled to prior art glitch latch input terminal 903; OR gate second input terminal 913 coupled to inverter output terminal 909; and OR gate output terminal 917. Prior art glitch latch 900 also included NAND gate 919 with: NAND gate first input terminal 921 coupled to OR gate output terminal 917; NAND gate second input terminal 923; and NAND gate output terminal 925. Prior art glitch latch 900 also included NOR gate 927 with: NOR gate first input terminal 929 coupled to NAND gate output terminal 925; NOR gate second input terminal 931 coupled to inverter input terminal 907 and prior art glitch latch input terminal 901; and NOR gate output terminal 933 coupled to prior art glitch latch output terminal 935 which carries the signal OUT.

As seen in FIG. 9A, prior art glitch latch 900 was a cross-coupled latch circuit. Those of skill in the art will readily recognize that other combinations of specific logic gates such as OR gate 911, NAND gate 919, and NOR gate 927, could be, and were, properly employed to yield the same logical result as prior art glitch latch 900.

Figure 9B:
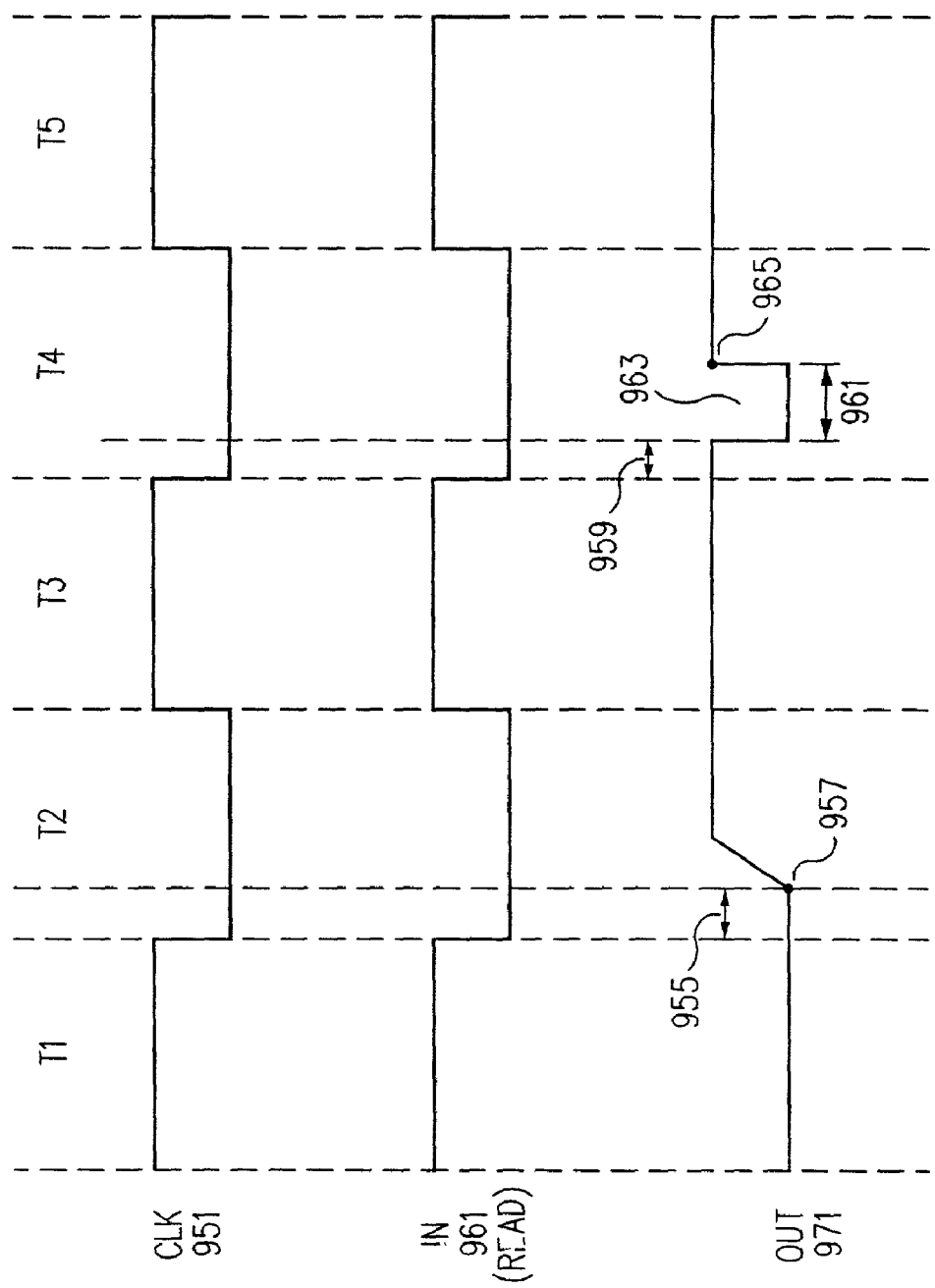
FIG. 9B shows a timing diagram for a prior art glitch latch including signals CLK, IN, and OUT when signal IN is the free running signal READ from the IRL of FIG. 3.

FIG. 9B shows a timing diagram for prior art glitch latch 900 including signals CLK 951, IN 961, and OUT 971. In FIG. 9B, signal IN is the free running signal READ from IRL 305 of FIG. 3. Note that signal OUT 971 holds state during each of the pre-charge cycles of CLK 951, i.e., signal OUT 971 is steady during times T1, T3 and T5. However, during the evaluate phases of CLK 951, i.e., times T2 and T4, signal OUT 971 can change. Note also that the signal OUT 971 should be the inverted value of signal IN 961 during each evaluation phase, i.e., T2 and T4, of CLK 951.

As an example, during time T1, a pre-charge phase of CLK 951: signal CLK 951 is high; signal IN 961 is high; and signal OUT 971 is low (holding the inverted value of signal IN 961 during the last evaluate phase). At time T2, an evaluate phase of CLK 951: CLK 951 is low; IN 961 is low; and, after a short signal delay 955, signal OUT goes high at point 957, reflecting the inverted value of signal IN 961. At time T3, a pre-charge phase of CLK 951: CLK 951 is high; IN 961 is high; and OUT 971 is held high at the inverted value of IN 961 in the last evaluate phase, T2, of CLK 951.

At time T4, an evaluate phase of CLK 951: CLK 951 is low; IN 961 is low; and, since signal IN 961 is low, signal OUT 971 should remain high. However, as seen in FIG. 9B, after a short signal delay 959, signal OUT 971 goes low for a short period of time 961 as prior art glitch latch 900 is opened. This low for short period of time 961 is called the reset edge, or "glitch", 963 which gives rise to the name of prior art glitch latch 900.

As shown in FIG. 9B, at point 965 prior art glitch latch recovers and signal OUT 971 returns to the proper high value that is the inverted value of signal IN 971. Consequently, in this prior art example, where signal IN is the free running signal READ from IRL 305 (FIG. 3), no harm is done by glitch 965. However, if signal IN 961 did not, change state, i.e., go low at time T4, then signal OUT 971 would remain low through T4 and T5 as prior art glitch latch 900 failed to recover and glitch 963 proved fatal to the system.

Figure 9C:
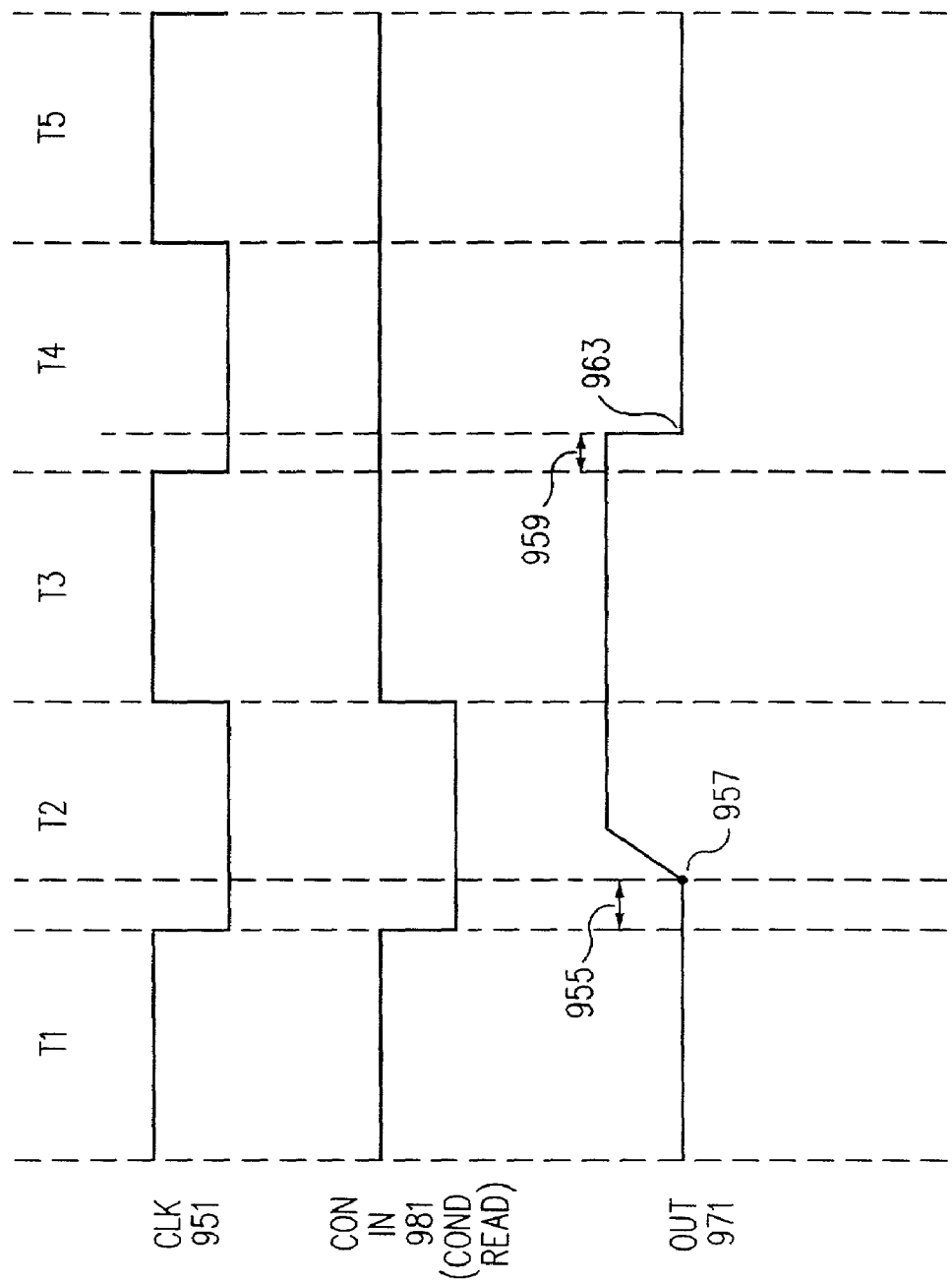
FIG. 9C shows one example of a timing diagram where a prior art glitch latch is used with the invention including the signal CONDITIONAL READ as signal IN at the prior art glitch latch input terminal of FIG. 9A.

Unfortunately, the fatal failure described above is precisely what results when prior art glitch latch 900 is used with the invention discussed above including the signal CONDITIONAL READ 853 (FIG. 8), generated from output 717 of Nor-Gate 701 in FIG. 7, as the signal IN 961. FIG. 9C shows one example of a timing diagram where prior art glitch latch 900 is used with the invention discussed above including the signal CONDITIONAL READ 981 as signal CON IN 981 at prior art glitch latch input terminal 901 (FIG. 9A).

As seen in FIG. 9C, during time T1, a pre-charge phase of CLK 951: signal CLK 951 is high; signal CON IN 981 is high; and signal OUT 971 is low (holding the inverted value of CON IN 981 during the last evaluate phase). At time T2, an evaluate phase of CLK 951: CLK 951 is low; CON IN 961 goes low; and, after a short signal delay 955, signal OUT goes high at point 957, reflecting the inverted value of signal CON IN 961. At time T3, a pre-charge phase of CLK 951: CLK 951 is high; CON IN 981 goes high; and OUT 971 is held high at the inverted value of CON IN 981 in the last evaluate phase, T2, of CLK 951. At time T4, an evaluate phase of CLK 951: CLK 951 is low; CON IN 981 remains high; and, since signal CON IN 981 remains high, and after a short signal delay 959, signal OUT 971 goes low. As discussed above, this low is caused by the reset edge, or glitch, 963 which gives rise to the name of prior art glitch latch 900.

However, in contrast to the discussion above regarding FIG. 9B, in FIG. 9C prior art glitch latch does not recover and signal OUT 971 does not return to the proper value. This is because the signal CON IN 981, unlike signal IN 961 of FIG. 9B, is not free running and, in this example, does not change state at time T4. Consequently, signal OUT 971 remains low through T4 and T5 as prior art glitch latch 900 fails to recover and glitch 963 proves fatal.

As seen above, prior art glitch latches, such as prior art glitch latch 900 cannot be used with the method of FIG. 6 or the structure of FIGS. 7 and 8 discussed above. This is particularly problematic in light of the fact that, as discussed above, in some embodiments of the invention it is particularly advantageous to utilize "glitch type latches" as RBL sensing devices, such as S0 to SN in FIG. 4 and S1 in FIG. 7. This is because glitch latches are designed to operate on a pre-charge and evaluate cycle basis and glitch latches have a very small physical layout. What is needed is a "glitch type" latch that can be used reliably with the method of FIG. 6 or the structure of FIGS. 7 and 8 discussed above.

Figure 10:
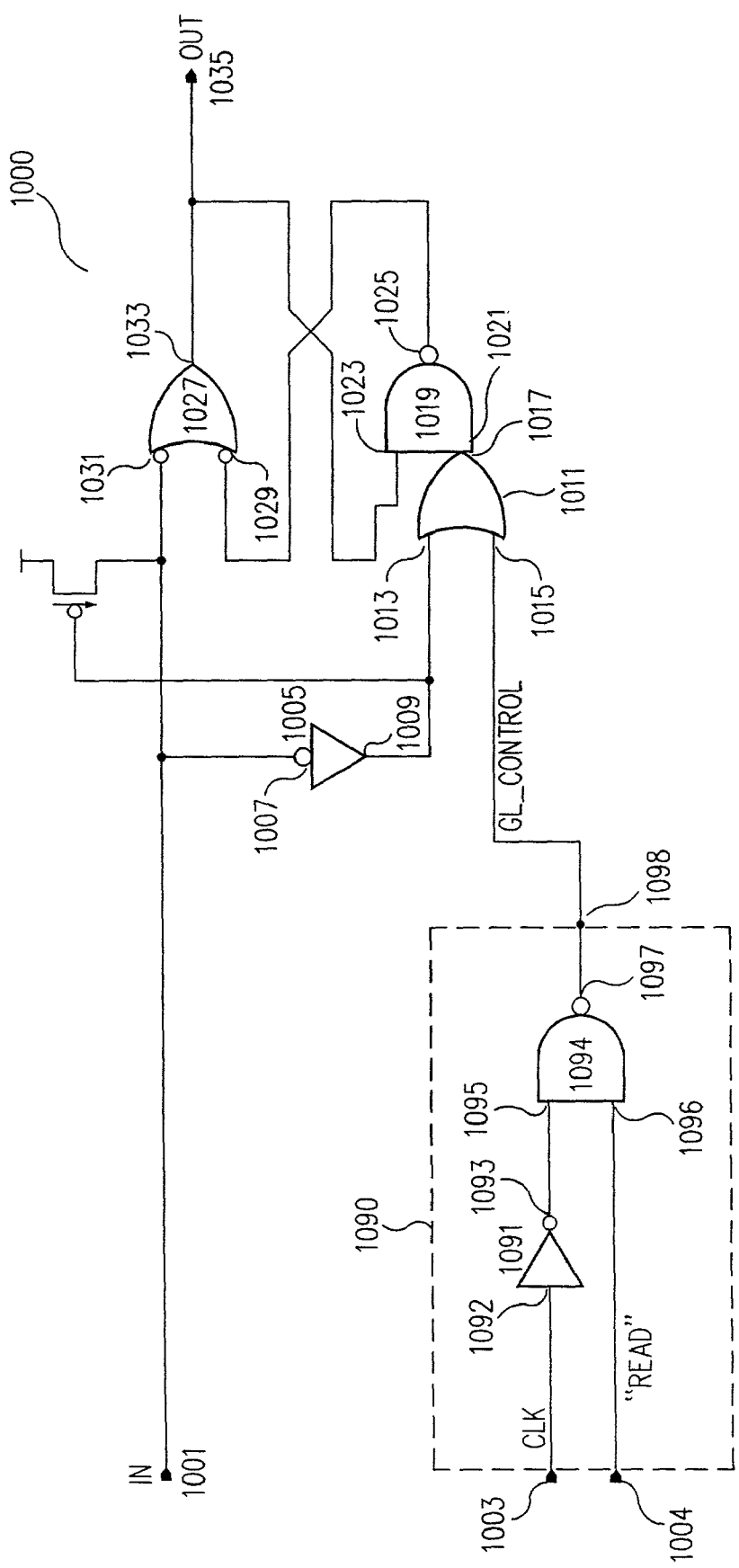
FIG. 10 shows a modified glitch latch according to the principles of one embodiment of the present invention.

FIG. 10 shows a modified glitch latch 1000 according to the principles of one embodiment of the present invention.

Modified glitch latch 1000 includes modified glitch latch input 1001, coupled to signal IN, and modified glitch latch input 1003, coupled to clock signal CLK. Modified glitch latch 1000 also includes first inverter 1005, with first inverter input terminal 1007 coupled to modified glitch latch input terminal 1001 and first inverter output terminal 1009. Modified glitch latch 1000 also includes OR gate 1011, with: OR gate first input terminal 1015; OR gate second input terminal 1013, coupled to inverter output terminal 1009; and OR gate output terminal 1017. Modified glitch latch 1000 also includes first NAND gate 1019 with: first NAND gate first input terminal 1021 coupled to OR gate output terminal 1017; first NAND gate second input terminal 1023; and first NAND gate output terminal 1025. Modified glitch latch 1000 also includes NOR gate 1027 with: NOR gate first input terminal 1029 coupled to first NAND gate output terminal 1025; NOR gate second input terminal 1031 coupled to first inverter input terminal 1007 and modified glitch latch input terminal 1001; and NOR gate output terminal 1033 coupled to modified glitch latch output terminal 1035 which carries signal OUT.

As seen in FIG. 10, in one embodiment of the invention, modified glitch latch 1000 also includes control circuit 1090. In one embodiment of the invention, control circuit 1090 includes modified glitch latch third input terminal 1004 which is coupled to the signal "READ". In one embodiment of the invention, control circuit 1090 includes a second inverter 1091 with: second inverter input terminal 1092, coupled to modified glitch latch input 1003 and signal CLK; and second inverter output terminal 1093. In one embodiment of the invention, control circuit 1090 also includes second NAND gate 1094 with: second NAND gate first input terminal 1096 coupled to modified glitch latch third input terminal 1004 and signal READ; second NAND gate second input terminal 1095 coupled to second inverter output terminal 1093; and second NAND gate output terminal 1097 coupled to control circuit output terminal 1098 and OR gate first input terminal 1015.

As seen in FIG. 10, modified glitch latch 1000 is a modified cross-coupled latch circuit. Those of skill in the art will readily recognize that other combinations of specific logic gates such as OR gate 1011, first NAND gate 1019, NOR gate 1027, and Second NAND gate 1094, can be properly employed to yield the same logical result as modified glitch latch 1000. Consequently, the particular example shown in FIG. 10 of one embodiment of the modified glitch latch of the invention is chosen for simplicity and for exemplary purposes only. Therefore, the modified glitch latch of the invention is not limited by the particular example shown.

Figure 11:
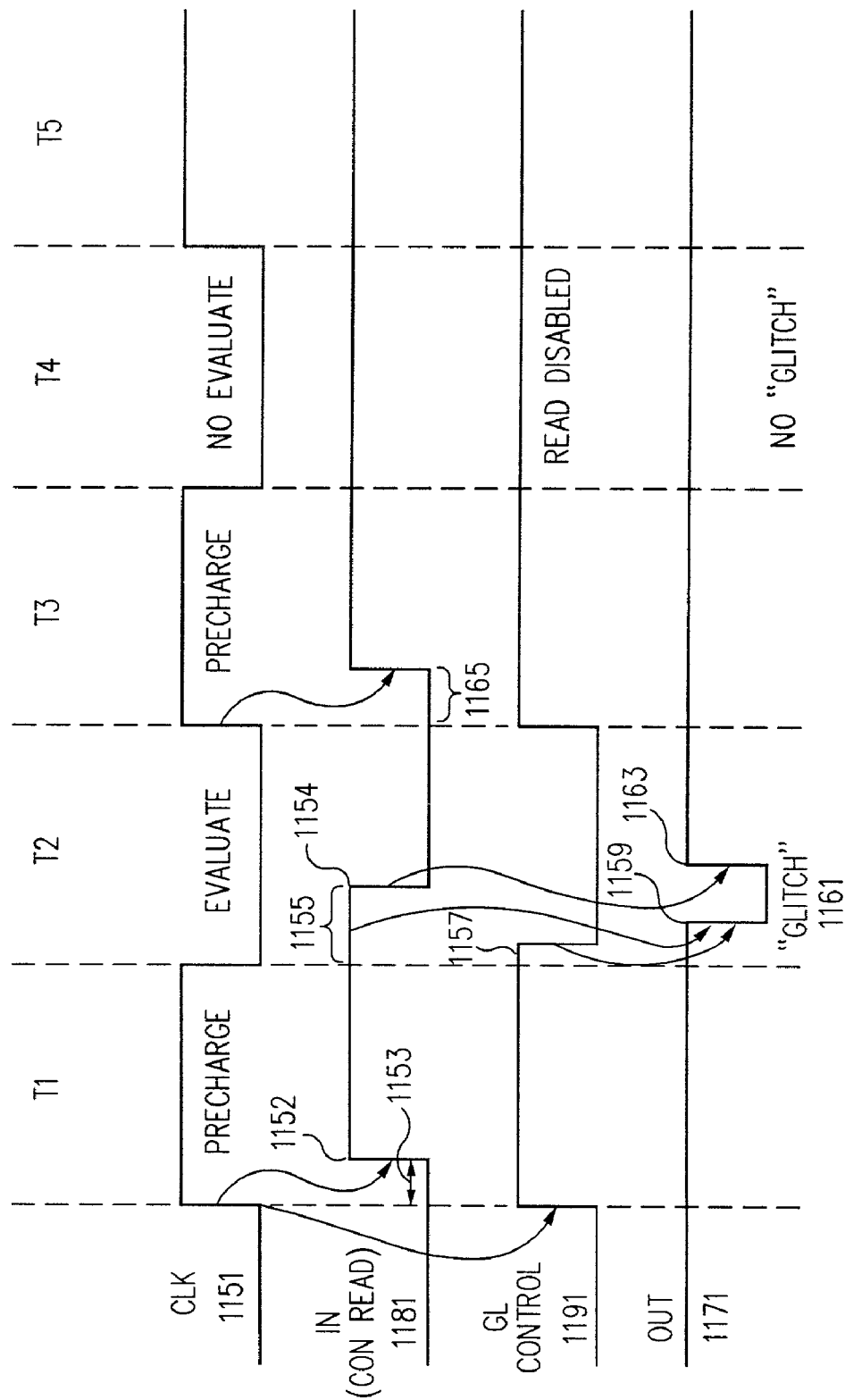
FIG. 11 shows a timing diagram for a modified glitch latch, such as the glitch latch of FIG. 10, designed according to the principles of the present invention.

FIG. 11 shows a timing diagram for a modified glitch latch, such as glitch latch 1000 of FIG. 10, designed according to the principles of the present invention. Shown in FIG. 11 are: signal CLK 1151; signal IN 1181, which in one embodiment of the invention is the signal CONDITIONAL READ 853 from FIG. 8; signal GL CONTROL 1191 from control circuit output terminal 1098 of control circuit 1090 of modified glitch latch 1000 of FIG. 10; and signal OUT from modified glitch latch output terminal 1035 of modified glitch latch 1000 of FIG. 10.

As seen in FIG. 11, during time T1, a pre-charge phase of CLK 1151: signal CLK 1151 is high; signal IN 1181 goes high at point 1152, after short delay 1153; signal GL CONTROL 1191 goes high; and signal OUT 1171 is high (holding the inverted value of signal IN 1181 during the last evaluate phase). At time T2, an evaluate phase of CLK 1151: CLK 1151 is low; IN 1181 goes low at point 1154, after signal delay 1155; signal GL CONTROL 1191 goes low, after a short signal delay 1157; and signal OUT goes low at point 1159, the beginning of reset edge or "glitch" 1161 as the modified glitch latch opens. However, as also shown in FIG. 11, since signal IN 1181 does go low at point 1154 in time T2, signal OUT 1171 returns to the proper high value at point 1163 that reflects the inverted value of signal IN 1161. Consequently, the modified glitch latch recovers.

Continuing with the example shown in FIG. 11, at time T3, a pre-charge phase of CLK 1151: CLK 1151 goes high; signal IN 1181 goes high, after a short signal delay 1165; signal GL CONTROL 1191 goes high; and signal OUT 1171 is held high at the inverted value of signal IN 1181 in the last evaluate phase, T2, of CLK 1151. At time T4, an evaluate phase of CLK 1151: CLK 1151 is low, however, in this example, the signal ADVANCE POINTER (not shown) remains low, i.e., the pointer (not shown) has not advanced, the data has not changed and no read is initiated in accordance with the invention. Consequently, the signal IN 1181 remains high. In addition, since in this example, signal IN 1181 does not change, signal GL CONTROL 1191 also remains high. Since, according to the invention, signal GL CONTROL 1191 remains high when the data has not changed, a read by modified glitch latch 1000 (FIG. 10) is disabled and the signal OUT 1171 (FIG. 11) remains high with no glitch, such as glitch 1161, being introduced.

Recall that prior art glitch latches, such as prior art glitch latch 900 of FIG. 9A, could not be used with the method of FIG. 6 or the structure of FIGS. 7 and 8, discussed above, because the prior art glitch latch was opened each evaluate cycle and the resulting glitch caused signal OUT 971 to remain low through T4 and T5 as prior art glitch latch 900 failed to recover (see FIGS. 9A and 9C).

In contrast, as shown in FIG. 11, according to the invention, the modified glitch latch, such as modified glitch latch 1000 of FIG. 10, is not opened unless there is new data and the signal IN 1181 goes low. Consequently, according to the invention, the reset edge or glitch, such as glitch 1161 is not introduced unless there is new data and the signal IN 1181 goes low, which, in turn, allows the modified glitch latch and signal OUT 1171 to recover.

Figure 12:
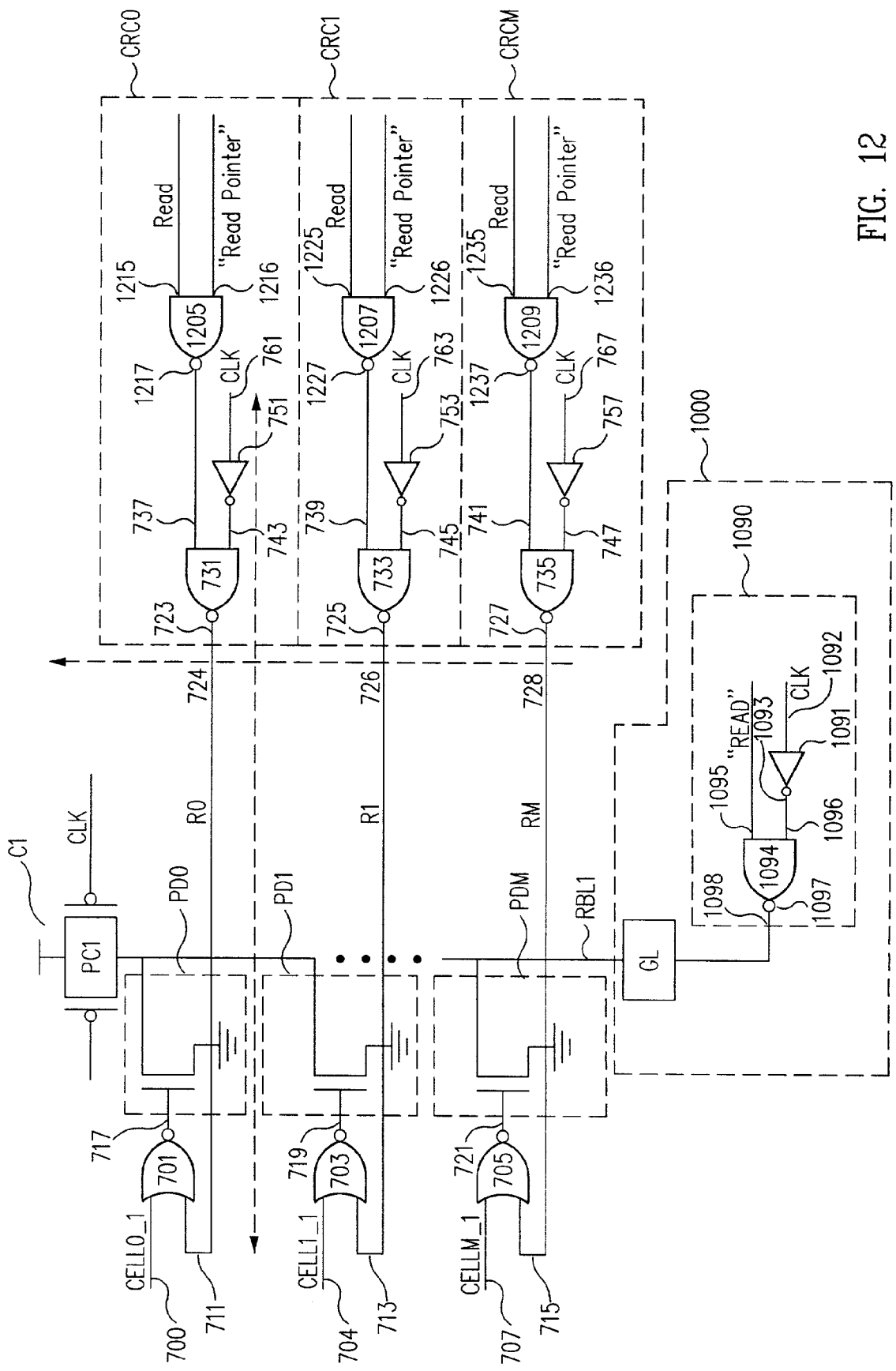
FIG. 12 shows, in block diagram form, a modified glitch latch in use with a portion of exemplary modified column C1 of an RPA that has been modified in accordance with the present.

FIG. 12 shows, in block diagram form, modified glitch latch 1000 in use with a portion of an exemplary modified column, such as exemplary modified column C1 of FIG. 7, of an RPA, such as RPA 307 of FIG. 4, which has been modified in accordance with the present invention. While modified column C1 is chosen for exemplary purposes, the structure of FIG. 12, and the following discussion, is equally applicable to any of the columns C1 to CN shown in FIG. 4 that are modified according to the present invention.

As seen in FIG. 12, modified column C1 includes pre-charge device PC1, in this case a PFET, and modified glitch latch 1000. Also shown in FIG. 12 are rows R0, R1 and RM. In the embodiment of the invention shown in FIG. 12, each row R0 to RM includes a corresponding pull-down device PD0 to PDM, respectively. In actual practice, as shown in FIG. 4, each row R0 to RM would include numerous memory cells (not shown) and numerous pull-down devices PD0 to PDM equal to the number of columns "N". As shown in FIG. 12, in one embodiment of the invention, each pull-down device PD0 to PDM is coupled to a read bit line, RBL1, as shown.

According to one embodiment of the invention, each pull-down device PD0 to PDM is coupled to the output 717, 719, 721, respectively, of a corresponding one of Nor-Gates 701, 703, and 705, respectively. According to the invention, a signal "CONDITIONAL READ" (853 in FIG. 8) is generated at outputs 717, 719, and 721, respectively, of a corresponding one of Nor-Gates 701, 703, and 705 (FIG. 12), respectively. When active, the signal "CONDITIONAL READ" initiates a read of RPA 307 (FIG. 4).

As seen in FIG. 12, a first input line 700, 704, and 707 of Nor-Gates 701, 703, and 705, respectively, is coupled to receive signals CELL0_1, CELL1_1, CELLM_1, respectively. Signals CELL0_1, CELL1_1, CELLM_1 are signals representing the contents of corresponding memory cells, such as exemplary memory cells 405 and 406 in FIG. 4. Second input lines 711, 713, and 715 of Nor-Gates 701, 703, 705, respectively, are coupled to the outputs 724, 726, and 728 of conditional read circuits CRC0, CRC1 and CRCM, respectively.

In one embodiment of the invention, conditional read circuits CRC0, CRC1 and CRCM each include a first NAND-Gate, 731, 733 and 735, respectively, an inverter, 751, 753 and 757, respectively, and a second NAND gate 1205, 1207 and 1209, respectively. In one embodiment of the invention the signal CLK, i.e., the signal "CLK" is coupled to input lines 761, 763 and 767 of inverters 751, 753 and 757, respectively. The inverted "CLK" signal is then coupled to the first input lines 743, 745 and 747 of NAND-Gates, 731, 733 and 735, respectively. In one embodiment of the invention, the second input lines 737, 739, and 741 of first NAND-Gates, 731, 733 and 735, respectively, are coupled to outputs 1217, 1227 and 1237 of second NAND gates 1205, 1207 and 1209. In one embodiment of the invention, the signal "READ POINTER" is coupled to a first input line 1216, 1226, and 1236, of second NAND gates 1205, 1207 and 1209, respectively. In one embodiment of the invention, the signal "READ" or "READ ENABLE" is coupled to a second input line 1215, 1225, and 1235, of second NAND gates 1205, 1207 and 1209, respectively. As shown in FIG. 12, in one embodiment of the invention, the outputs 723, 725, and 727 of first NAND-Gates, 731, 733 and 735, respectively, are coupled to outputs 724, 726, and 728 of conditional read circuits CRC0, CRC1 and CRCM, respectively.

As also shown in FIG. 12, modified glitch latch 1000 is coupled to RBL1 as the sensing device. Modified glitch latch 1000 includes control circuit 1090. In one embodiment of the invention, control circuit 1090 includes second inverter 1091 having second inverter input 1092 coupled to signal CLK and second inverter output 1093 coupled to second NAND gate first input terminal 1096. In one embodiment of the invention, control circuit 1090 includes second NAND gate 1094 having second NAND gate second input terminal 1095 coupled to the signal "READ" or READ ENABLE" and second NAND gate output terminal 1097 coupled to control circuit output terminal 1098.

According to the invention, the pointer advance signal "READ" is logically combined with the primary clock signal "CLK" and the read pointer signal "READ POINTER" to compute whether the read pointer has advanced since the last read. If the read pointer has advanced, then there is new data to read and a read of the RPA is initiated, otherwise the read is disabled. Consequently, according to the invention, a read of the RPA occurs only when there is new data to be read and the retire pointer shifts in the B phase of the clock.

In addition, in one embodiment of the invention, the signal "READ" is logically combined with the primary clock signal "CLK" in a control circuit of a modified glitch latch such that the glitch latch will only reset, and therefore a reset edge or glitch will only appear, when new data is read and the signal IN will return to zero. Consequently, a reset edge or glitch will only appear when the glitch latch can recover. Therefore, using the modified glitch latch of the invention, no fatal errors are introduced.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention.

For example, for illustrative purposes, specific embodiments of the invention were shown with specific control circuits for the modified glitch latch of the invention, with specific gates. However, those of skill in the art will recognize that different gates and combination of gates could be used to form control circuits for the modified glitch latch of the invention, which would function in the same way. Therefore, the specific control circuits for the modified glitch latch of the invention, were chosen for illustrative purposes only and the invention is not limited to the specific embodiments shown. Consequently, the scope of the invention is defined by the claims and their equivalents.

What is claimed is:

1. A modified glitch latch, said modified glitch latch being a sensing element coupled to a read word line of a retirement payload array, said modified glitch latch comprising:
   a modified glitch latch output terminal;
   a control circuit, said control circuit comprising a control circuit first input terminal, a control circuit second input terminal and a control circuit output terminal;
   a clock signal coupled to said control circuit first input terminal, said clock signal having a first or "A" phase and a second or "B" phase;
   a read signal coupled to said control circuit second input terminal, said read signal having a first or inactive phase and a second or active phase, said second or active phase of said read signal corresponding to a shift in position of a read pointer of said retirement payload array, wherein;
   a control signal from said control circuit output terminal opens said modified glitch latch only when, both:
   said clock signal is in said "B" phase; and
   said read signal is in said active phase.

2. The method of claim 1, wherein;
   said retirement payload array comprises M read word lines and N read bit lines, further wherein;
   each of said M read word lines is coupled to a corresponding one of M modified glitch latches.

3. The method of claim 2, wherein;
   said number of rows M is equal to 16 and said number of columns N is equal to 192 such that said retirement payload array is a 192 column and 16 row retirement payload array.

4. The method of claim 2, wherein;
   said retirement payload array is a 192 column, 16-read word line register file structure employing a dynamic, full swing pull down read mechanism.

5. A modified glitch latch, said modified glitch latch comprising:
   a modified glitch latch first input terminal;
   a signal IN coupled to said modified glitch latch first input terminal;
   a first inverter, said first inverter comprising a first inverter input terminal coupled to said modified glitch latch first input terminal and a first inverter output terminal;

an OR gate, said OR gate comprising an OR gate first input terminal, an OR gate second input terminal, coupled to said first inverter output terminal, and an OR gate output terminal;

a first NAND gate, said first NAND gate comprising a first NAND gate first input terminal, coupled to said OR gate output terminal, a first NAND gate second input terminal and a first NAND gate output terminal;

a NOR gate, said NOR gate comprising a NOR gate first input terminal, coupled to said NAND gate output terminal, a NOR gate second input terminal, coupled to said modified glitch latch first input terminal and a NOR gate output terminal, coupled to said a first NAND gate second input terminal;

a modified glitch latch output terminal coupled to said NOR gate output terminal;

a control circuit, said control circuit comprising a control circuit first input terminal, a control circuit second input terminal and a control circuit output terminal;

a clock signal coupled to said control circuit first input terminal, said clock signal having a first or "A" phase and a second or "B" phase;

an read signal coupled to said control circuit second input terminal, said read signal having a first or inactive phase and a second or active phase, wherein;

said control circuit output terminal is coupled to said OR gate first input terminal such that a control signal from said control circuit output terminal is coupled to said OR gate first input terminal, further wherein:

said control signal from said control circuit output terminal opens said modified glitch latch only when, both:

said clock signal is in said "B" phase; and said read signal is in said active phase.

6. The structure of claim 5, wherein;

said modified glitch latch is a sensing element coupled to a read word line of a retirement payload array and said second or active phase of said read signal corresponds to a shift in position of a read pointer of said retirement payload array.

7. The method of claim 6, wherein;

said retirement payload array comprises M read word lines and N read bit lines, further wherein;

each of said M read word lines is coupled to a corresponding one of M modified glitch latches.

8. The method of claim 7, wherein;

said number of rows M is equal to 16 and said number of columns N is equal to 192 such that said retirement payload array is a 192 column and 16 row retirement payload array.

9. The method of claim 7, wherein;

said retirement payload array is a 192 column, 16-read word line register file structure employing a dynamic, full swing pull down read mechanism.

10. The modified glitch latch of claim 5, wherein;

said control circuit comprises:

a second inverter, said second inverter comprising a second inverter input terminal, coupled to said control circuit first input terminal, and a second inverter output terminal;

a second NAND gate, said second NAND gate comprising a second NAND gate first input terminal, coupled to said control circuit second input terminal, a second NAND gate second input terminal, coupled to said second inverter output terminal, and a second NAND gate output terminal coupled to said control circuit output terminal.

11. The structure of claim 10, wherein;

said modified glitch latch is a sensing element coupled to a read word line of a retirement payload array.

12. The method of claim 11, wherein;

said retirement payload array comprises M read word lines and N read bit lines, further wherein;

each of said M read word lines is coupled to a corresponding one of M modified glitch latches.

13. The method of claim 12, wherein;

said number of rows M is equal to 16 and said number of columns N is equal to 192 such that said retirement payload array is a 192 column and 16 row retirement payload array.

14. The method of claim 12, wherein;

said retirement payload array is a 192 column, 16-read word line register file structure employing a dynamic, full swing pull down read mechanism.

15. A method for controlling the operation of a modified glitch latch, said glitch latch being a sensing element coupled to a read word line of a retirement payload array, said method comprising:

receiving a clock signal, said clock signal having a first or "A" phase and a second or "B" phase;

receiving a read signal, said read signal having a first or inactive phase and a second or active phase, said second or active phase of said read signal corresponding to a shift in position of a read pointer of said retirement payload array; and opening said modified glitch latch only when, both:

said clock signal is in said "B" phase;

and said read signal is in said active phase.

16. The method of claim 15, wherein;

said retirement payload array comprises M read word lines and N read bit lines, further wherein;

each of said M read word lines is coupled to a corresponding one of M modified glitch latches.

17. The method of claim 16, wherein;

said number of rows M is equal to 16 and said number of columns N is equal to 192 such that said retirement payload array is a 192 column and 16 row retirement payload array.

18. The method of claim 17, wherein;

said retirement payload array is a 192 column, 16-read word line register file structure employing a dynamic, full swing pull down read mechanism.

* * * * *